(12) United States Patent
Rossano et al.

(10) Patent No.: US 11,481,892 B2
(45) Date of Patent: Oct. 25, 2022

(54) METHOD AND APPARATUS FOR IMAGING ANALYSIS OF A SWITCHGEAR OR THE LIKE

(71) Applicant: ABB Schweiz AG, Baden (CH)

(72) Inventors: Gregory F. Rossano, Enfield, CT (US); Gregory A. Cole, West Hartford, CT (US); Tomas Kozel, Brno (CZ); Jianjun Wang, West Hartford, CT (US)

(73) Assignee: ABB SCHWEIZ AG, Baden (CH)

( * ) Notice: Subject to any disclaimer, the term of this patent is extended or adjusted under 35 U.S.C. 154(b) by 251 days.

(21) Appl. No.: 16/869,006

(22) Filed: May 7, 2020

(65) Prior Publication Data

US 2020/0265572 A1    Aug. 20, 2020

Related U.S. Application Data

(63) Continuation of application No. PCT/US2018/059589, filed on Nov. 7, 2018.

(60) Provisional application No. 62/582,723, filed on Nov. 7, 2017.

(51) Int. Cl.
| G06T 7/00 | (2017.01) |
| G06T 7/90 | (2017.01) |
| G01N 21/27 | (2006.01) |
| G01N 21/88 | (2006.01) |

(52) U.S. Cl.
CPC .............. *G06T 7/001* (2013.01); *G01N 21/27* (2013.01); *G01N 21/8851* (2013.01); *G06T 7/90* (2017.01); *G06T 2207/30164* (2013.01)

(58) Field of Classification Search
CPC ... G06T 7/0004; G06T 7/0006; G06T 7/0008; G06T 7/001; G06T 2207/30141; G06T 2207/30164; G01N 21/8803; G01N 21/8851; G01N 2021/8887; G01N 2021/889; H02B 3/00
See application file for complete search history.

(56) References Cited

U.S. PATENT DOCUMENTS

| 5,608,453 A | 3/1997 | Gerber et al. |
| 2004/0044483 A1 | 3/2004 | Menon et al. |
| 2005/0231713 A1 | 10/2005 | Owen et al. |
| 2008/0291040 A1 | 11/2008 | Cutsforth |

(Continued)

FOREIGN PATENT DOCUMENTS

| EP | 3010101 A1 | 4/2016 |
| GB | 2514180 A | 11/2014 |
| WO | 2004020984 A1 | 3/2004 |

(Continued)

OTHER PUBLICATIONS

International Searching Authority/US, International Search Report & Written Opinion issued in corresponding Application No. PCT/US2018/059589, dated Feb. 1, 2019, 10 pp.

(Continued)

*Primary Examiner* — Andrew W Johns
(74) *Attorney, Agent, or Firm* — Greenberg Traurig, LLP

(57) ABSTRACT

A method is disclosed for inspecting electrical components within a housing. The method may be useful for identifying dust, grime, corrosion, tree-like structures, edges and/or slots on electrical components. The method includes capturing two optical images of an electrical component and comparing the images. Variations in pixels between the two images may be used to generate warnings.

20 Claims, 16 Drawing Sheets

(56) References Cited

U.S. PATENT DOCUMENTS

2015/0070507 A1  3/2015  Kagan
2017/0122837 A1  5/2017  Mtauweg

FOREIGN PATENT DOCUMENTS

WO  2008148060 A3  12/2008
WO  2014184337 A1  11/2014

OTHER PUBLICATIONS

European Extended Search Report, Counter EP Appln. Serial No. 18876090.4, dated Jun. 30, 2021, 8 pgs.

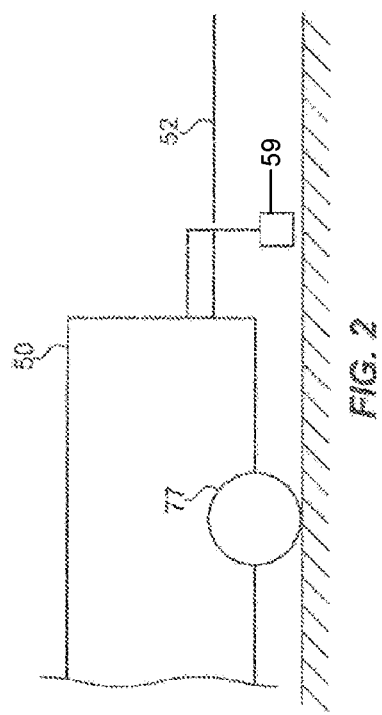
FIG. 2
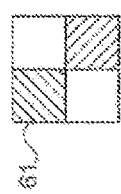
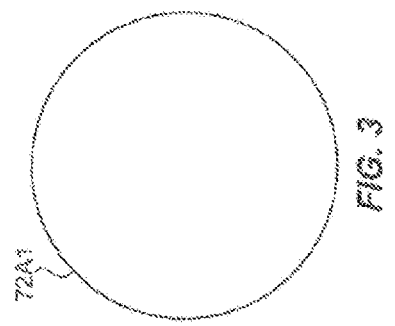
FIG. 3
FIG. 4

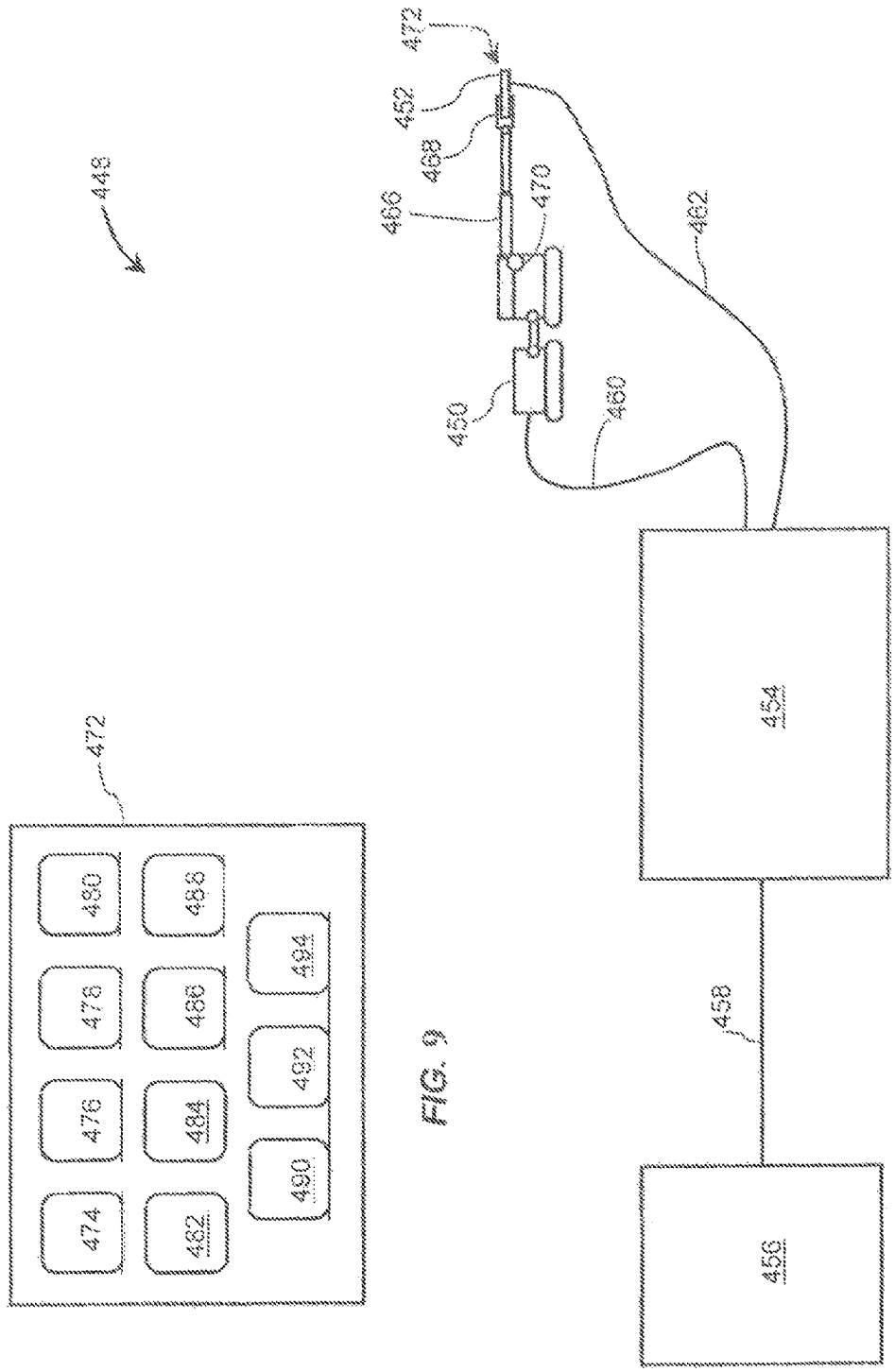

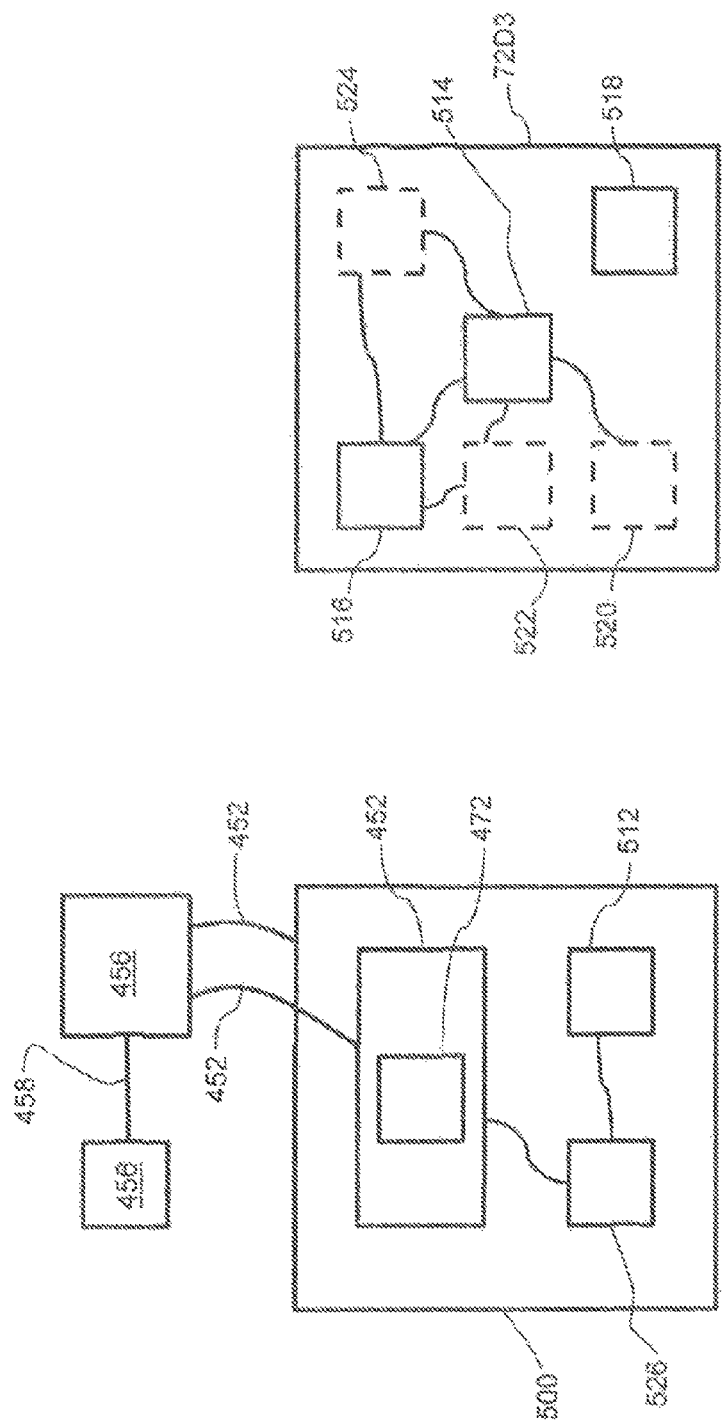

METHOD AND APPARATUS FOR IMAGING ANALYSIS OF A SWITCHGEAR OR THE LIKE

TECHNICAL FIELD

The present application generally relates to imaging analysis of components in a housing containing electrical apparatus (E-House) and more particularly, but not exclusively, to capturing and analyzing high resolution optical images of certain components such as a switchgear or the like.

BACKGROUND

Detecting component degradation within an E-House can be time consuming and/or dangerous if performed by a human inspector. Automated detection and analysis of inspection data is an area of interest. Some existing systems have various shortcomings relative to certain applications. Accordingly, there remains a need for further contributions in this area of technology.

SUMMARY

One embodiment of the present application is a method for collecting and analyzing an optical image of a component or a region of interest (ROI) in an E-House. Other embodiments include apparatuses, systems, devices, hardware, methods, and combinations for using a robot system with a camera operable for obtaining optical images of an ROI within an E-House. Further embodiments, forms, features, aspects, benefits, and advantages of the present application shall become apparent from the description and figures provided herewith.

A method of inspecting electrical components within a housing is disclosed in which a first camera is positioned within the housing and a first optical image is captured of an electrical component within the housing with the first camera. The first optical image is recorded for later use. Thereafter, a second camera is positioned within the housing and a second optical image is captured of the electrical component within the housing with the second camera. The pixels of the first and second optical images are then compared with an electronic control module, and a warning is generated if a variation between the pixels of the first optical image and the pixels of the second optical image is above a threshold.

If desired, the first and second cameras may be the same camera. The variation may be a color variation between the pixels of the first optical image and the pixels of the second optical image. The first optical image may be a baseline captured at a new, cleaned or reconditioned state of the electrical component. The second optical image may be captured more than one week after the first optical image. The electrical component or a portion thereof may be identified from the first optical image by the electronic control module as a continuous area of the pixels having a same color or shade. The comparison may identify dust, grime and/or corrosion in the second optical image by identifying a percentage change in the pixels of the first optical image and the pixels of the second optical image. The comparison may identify a tree-like structure, edge and/or slot in the second optical image by identifying pixel changes in the second optical image compared to the first optical image, and identifying neighboring pixels in the second optical image with matching color or shade. The electrical component may form a portion of at least one of a switchgear, a control gear, a motor controller and an uninterrupted power supply (UPS). The first and second optical images may be high resolution images of at least five megapixels. The first and second cameras may be conveyed into the housing to a desired location and angular orientation with at least one robot. The first and second cameras may be moved within the housing to a desired location and angular orientation with an internal maneuvering apparatus. The first and second optical images may be captured at the same location and angular orientation. The first and second optical images may be captured at the same light intensity.

BRIEF DESCRIPTION OF THE FIGURES

FIG. 2 depicts an embodiment of a robot following a track.

FIG. 3 depicts an embodiment of a fiducial marker and an associated portal.

FIG. 4 depicts an embodiment of a robot having a probe.

FIG. 8 schematically illustrates some aspects of a non-limiting example of a system for inspecting switchgear systems in accordance with an embodiment of the present invention.

FIG. 9 schematically illustrates some aspects of a non-limiting example of a sensor package in accordance with an embodiment of the present invention.

FIG. 11 schematically illustrates some aspects of a non-limiting example of a robot and a portal constructed to be opened by a robot in accordance with an embodiment of the present invention.

DETAILED DESCRIPTION OF THE ILLUSTRATIVE EMBODIMENTS

Figure 1:
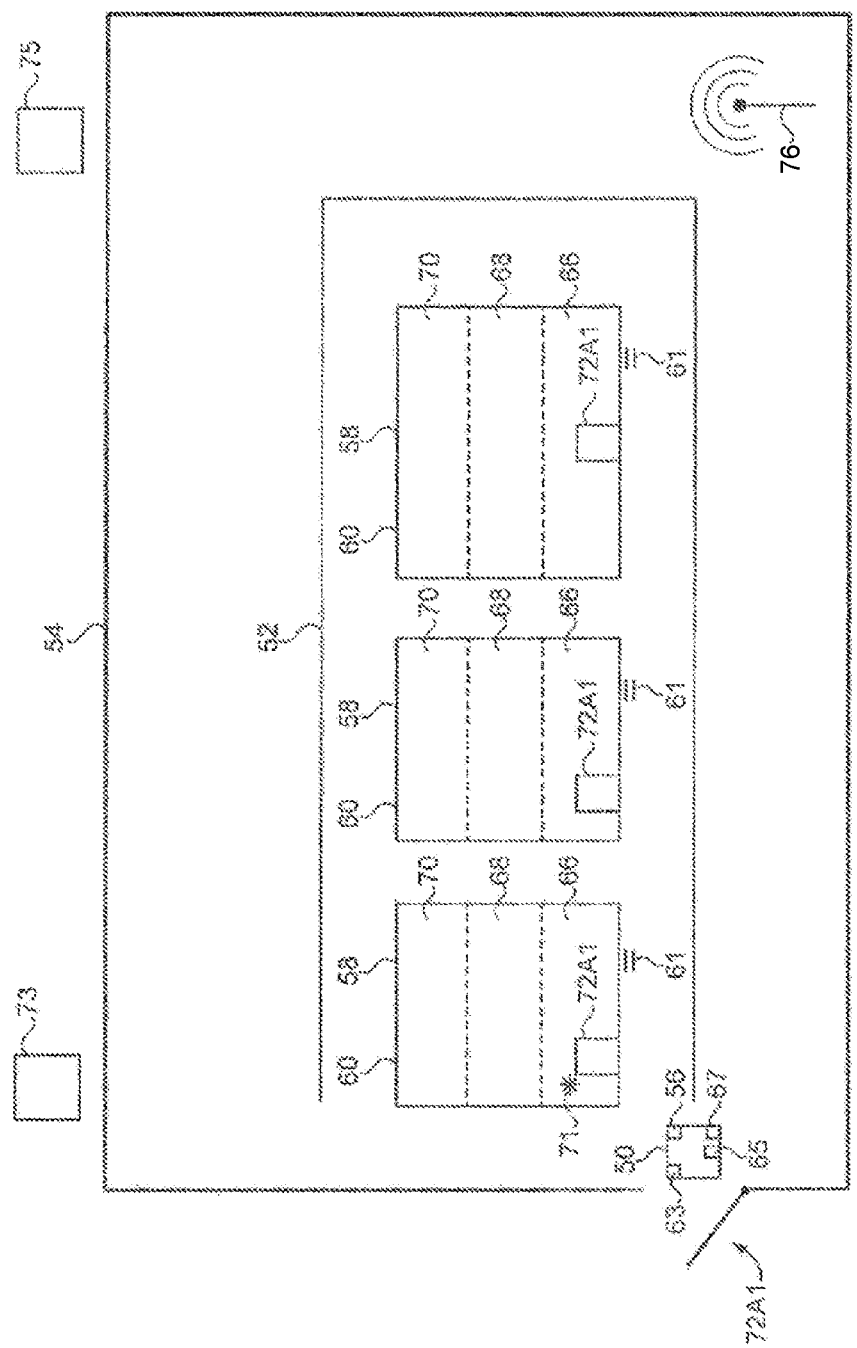
FIG. 1 depicts an embodiment of an inspection system that follows a pathway.

For the purposes of promoting an understanding of the principles of the application, reference will now be made to the embodiments illustrated in the drawings and specific language will be used to describe the same. It will nevertheless be understood that no limitation of the scope of the application is thereby intended. Any alterations and further modifications in the described embodiments, and any further applications of the principles of the application as described herein are contemplated as would normally occur to one skilled in the art to which the application relates.

With reference to FIG. 1, one embodiment of an inspection system is disclosed which includes a robot 50 capable of traversing along a path 52 to conduct an inspection of components (e.g. electrical components, high power components, etc) within a covered and/or enclosed structure 54, such as an E-House. The robot can convey a probe 56 in the form of a sensor used to measure an internal operating parameter of the E-House while electrical power is conveyed through the E-House during operation. The covered and/or enclosed structure 54 can be used to shelter any variety of components 58 including high power electrical components such as switchgear, variable speed drive cabinets, uninterrupted power supplies, dry transformers, HVAC equipment, etc, any one of which will be also be understood to have a covered and/or enclosed housing. For ease of convenience, the enclosure 54 may be referred to below as an E-House, but it will be appreciated that other types of enclosures are contemplated such as but not limited to any type having space large enough to permit human traffic. Also for ease of convenience, the components 58 (whether electrical, mechanical or otherwise) may be referred to as switchgear 58, but it will be understood that no limitation is hereby intended regarding the actual form of the component 58. In one form the switchgear 58 is an air insulated switchgear, but can also include switchgear housed in enclosures which contain non-atmospheric air.

The probe 56 can be inserted to measure an internal operating condition of the switchgear 58 and can include one sensor or an entire sensor package, including non-contact sensors. For example, the probe can take the form of a gas sensor; an infrared camera, a thermal imager, a humidity sensor, an acoustic sensor, an ultrasonic sensor, a visual light camera, a microphone, a 3-D microphone system, a hyperspectral imaging camera, a gas chromatography/mass spectrometry sensor, and a magnetometer.

The covered and/or enclosed structures 54 and/or 58 can include any number of walls, covers, roofs, etc useful to contain and/or provide shelter, and can include an access opening such as but not limited to a portal 72A1 (e.g. a door) through which the probe 56 can be conveyed to assess an internal operating condition of the switchgear 58. As will be described further below, embodiments of the instant application include various forms of robots 50 capable of deploying probes 56 into the interior of any structure that includes the high power electrical components and/or into the interior of the covered and/or enclosed housing that is generally associated with the switchgear.

The robot 50 can be remotely piloted, can be wirelessly piloted, or can be tethered and communication/control signals conveyed via the tether. In some forms the robot 50 can be autonomous. In other forms, the robot 50 can be autonomous with a manual override mode. In still further forms the robot 50 is capable of communication with a local station 73, or a remote base station 75, which permits interactive engagement with the robot via a technician or other operator. It will be appreciated that use of the robot 50 as described herein permits a technician to be outside of the E-House during the inspection thus increasing the overall safety posture of the inspection. In sum, the robot can be controlled using any variety of techniques, including onboard, local, and distant. The robot 50 can be a terrestrial robot structured to be transported along a path (whether or not marked) on the ground. In other alternative and/or additional embodiments, the robot 50 can be an aerial robot structured to be transported through the air via platforms that utilize any number of approaches such as propeller and lifting surface, rotor (e.g. helicopter or quadcopter, etc), or buoyant effects such as through an inflatable dirigible. The robot 50 can be robotic system that incorporates one or more of the above approaches. Further features of the robot 50 will be described further below.

As mentioned, the robot 50 is capable of moving along a path 52 such as a structured pathway 52 which can be any suitable type of demarcated pathway, physical or otherwise, that denotes an inspection route along which the robot 50 will be regulated to follow, where such regulation can take the form of mechanical constraint, navigation aid, computer vision assisted route following, etc. In some forms the robot 50 can autonomously map out an enclosure, such as an E-House, to collect data for use in constructing the structured pathway 52. Such construction of the structured pathway 52 can be via aid of a person, or can be autonomously determined by the robot 50. Though the structured pathway 52 shown in FIG. 1 is represented schematically, it will be appreciated that the pathway 52 can take on a variety of forms.

In some forms the structured pathway 52 is a mechanical rail that interacts with the robot to constrain the robot to the inspection route as the robot traverses the E-House 54. Such mechanical rail can take a variety of forms. For example, the rail can be a structured that extends from a base/bottom of a structure in the E-House 54 or the floor of the E-House, whether as a single structure or paired with another. In still other embodiments one or more rails can be recessed into the floor. In still other forms the rail can be an overhead structured which permits traversal of the robot. In some forms the pathway 52 can be enclosed, such as within a duct, vent, or other conduit that constrains the robot 50. In such forms the sidewalls of the duct/vent/conduit/etc can be used to constrain the robot, to set forth just one nonlimiting feature that could be used. The duct/vent/conduit/etc can either be an existing structure within the E-House 54, or can be a purpose built structure specifically for the robot 50 and/or probe 56.

In other forms the structured pathway 52 can be a marking useful to denote the inspection route through the E-House 54. Such a marking can be detected by the robot 50 (for example, as through computer vision) and used as a guide, similar to a mechanical track, to follow as the robot 50 conducts one or more inspection duties along the pathway 52. Any type of marking can be used, whether the marking is a line, symbol, marker, etc which is painted/bonded/affixed/inserted or otherwise attached to or within the E-House 54. Additionally and/or alternatively the marking can be a natural feature of the E-House (e.g. a concrete floor joint). In some forms the marking can be continuous in whole or part. Additionally and/or alternatively the marking can be discontinuous in whole or part. In sum, the marking can be any useful feature.

In still other alternative and/or additional forms the robot 50 can navigate the pathway 52 using a positioning system 76, such as but not limited to an indoor positioning system (IPS) capable of providing a signal from which position coordinates such as lateral, longitudinal, and height positions relative to a reference origin can be deduced. In other forms the positioning system can be an outdoor based positioning system such as but not limited to those that rely exclusively upon global positioning system satellite signals.

The indoor positioning system can utilize one or more systems to assist in determining position, such as, but not limited to: Wi-Fi based systems, Bluetooth based systems, wireless telephony based systems (e.g. 3G/4G (L TE), GSM, etc), mobile centric Wi-Fi, magnetic positioning, dead reckoning (e.g. using the last known position, possibly from an outdoor GPS signal), air pressure, barometer, accelerometer, and gyroscopes. GPS could also be used in some forms to augment one or more of the aforementioned techniques if using an indoor positioning system. The indoor position system can provide position either as an absolute position (such as but not limited to a WGS 84 position, or equivalent, available through GPS) or a relative position (such as might be measured from a reference point located somewhere in a room). In some applications the indoor positioning system determines a position and also determines a range of error that accompanies the position. The range of error can be a circular error of probability (CEP), or similar error. Such error of position can take on any number of values depending on the type of indoor positioning system used. In one system, the error in position can be approximately one meter.

The inspection path 52 through the E-House 54 can be a predetermined path (e.g. via mechanical rail or preprogrammed navigation path), but in some forms the inspection path 52 can be built dynamically during operation of the robot 50. For example, the route 52 can be built by waypoints designated by a technician as the robot 52 travels in the E-House. In still other forms, the inspection path 52 can be an adaptive path that can be determined on the basis of any number of items, such as but not limited to a priority list, successful passage of prior inspection points, etc. The robot 52 can dynamically determine the best path through the E-House as well. In still further features, individual route segments may be considered the structured pathway, while higher level guidance either designs further route segment (s), or dictates which route segments to select. In short, any form of inspection path 52, whether predetermined or dynamically defined, can be used.

To move about the pathway 52 the robot 50 can include an onboard source of motive power, such as a motor that provides mechanical motive power to drive the robot along the inspection route. In some forms the motive source of power is incorporated into the robot along with a source of power such as, but not limited to, a battery. The source of power (e.g. electrically stored power in a batter) and/or the motive power (e.g. an electric motor) can take any variety of forms.

While the motive power provides the ability of the robot 50 to be moved along the pathway 52, the robot 50 can traverse the pathway in a number of different manners. In one non-limiting embodiment, the robot 50 can include a member or feature that engages the mechanical rail mentioned above. Such a member can take the form of a wheel or other locomotive device useful to mechanically follow the rail (e.g. a rack, screw, etc). For ease of description but without limitation, reference will be made below to a protrusion 59 that extends from the robot 50 and useful to guide the robot along a rail 52, but it will be understood that analogous devices are also useful to engage the rail, whether or not it protrudes from the robot. FIG. 2 provides a non-limiting example of a protrusion 59 useful to engage a rail. The protrusion 59 can be any device suitable to engage the rail and constrain movement of the robot. For example, the protrusion can be any suitable mechanical device of any desired shape that can contact the rail and assist the robot in maintaining the inspection route defined by the rail. Such a protrusion can be one or more of a bumper or a rod.

In some forms the member used to engage the rail can be a concave circumferential groove bounded by a single or dual shoulders much like that used in some railway car implementations (e.g. a railway wheel), to set forth just a few nonlimiting examples. Other types of wheels are also contemplated. For example, a wheel can be used to that is free spinning and directly contacts a surface of the E-House, but other types of wheels are also contemplated. In some embodiments, wheels 77 can be used to permit movement of the robot 50 but in which the robot 50 is not constrained to mechanically move along a rail. Such non-tracked robot embodiments will be capable of moving along the structured pathway 52 using navigation aids, computer vision based regulation, etc.

In some embodiments a wheel can be used that is part of a flexible belt or even continuous band of treads/plates akin to a tank track which can operate with multiple wheels disposed therein is also contemplated herein. Such a wheel can be used to guide the tank track, and/or to drive the tank track. In one form the wheel can be a sprocket like wheel having a series of teeth that engage corresponding teeth in the tank track.

While embodiments of the robot 50 discussed above are mobile, in some forms the robot 50 can be a moveable robot in some embodiments, but in others one or more portions of the robot 50, or the entire robot 50, will be configured to remain in place. For example, the robot 50 can be delivered to an inspection station under power of another (e.g. a technician docking a robot system to the switchgear), but wherein the robot can still have an onboard source of power such as that needed to power any on board sensors, etc. For those embodiments in which one or more portions of the robot 50 remains in place (e.g. a "static" robot, or robot with static base, etc), the robot can initially be placed into its initial location through assistance of an operator, either in close proximity to a component to be inspected, or docked to a station from which the robot can inspect. The robot can be registered into place using any variety of mechanical and/or visual and/or magnetic aids and/or RF beacons, among potential others.

While the robot 50 can be moved along the pathway 52 in the E-House, one or more techniques can be used to determine the appropriate stopping location for purposes of conducting an inspection. In general the robot 50, or a base station which receives raw data from the robot 50, can be structured to detect a fiducial marker 61 associated with an inspection port of the switchgear assembly. The fiducial marker 61 can take many forms, whether mechanically-based, navigation-based, computer vision based, RF-based, etc. or combinations thereof. In general, the robot 50 will include a component useful to detect the fiducial marker 61, and either guide the robot/sensor probe 56 into a docked configuration relative to the fiducial marker 61, or through active engagement with the fiducial marker the robot 50 and/or sensor probe 56 will be accurately positioned for insertion of the robot 50 and/or sensor probe 56 into the switchgear system 58.

As stated above, the fiducial marker 61 can take any variety of forms. The fiducial marker 61 can be a mechanical registration structure such as one or more protrusions and/or one or more recesses capable of engaging a fiducial detecting component 63 of the robot, such as but not limited to complementary protrusion or recess of the robot 50. The fiducial marker 61 can be virtual, such as those based upon a location and/or orientation of one or more parts of the robot. For example, a positioning system can be used to assist in navigating the robot 50 to a portal 72A1 at which time either the robot 50 can enter the portal 72A1, or a measurement probe 56 of the robot can be inserted through the portal 72A1. The fiducial detecting component 63 of the robot can be a controller 65 having an algorithm that compares current position and/or orientation, with a desired position and/or orientation for insertion of the probe (the controller 65 can be structured to control any variety of other aspects as will be appreciated herein, such as commanding the probe to take data and/or deploy to a position, commanding a key to unlock and/or open a portal, etc). In some forms the fiducial marker can be a graphic/picture/target associated with the switchgear 58 and/or portal 72A1, where the fiducial detecting component 63 can include a camera with associated computer vision processing to detect the same. FIG. 3 illustrates a non-limiting embodiment of a fiducial marker 61 in the form of a graphic placed in proximity to a portal 72A1. In other forms the fiducial marker 61 can be a component of the switchgear assembly 58, such as a latch or knob (or one or more aspects of the portal 72A1 itself), with associated computer vision techniques to detect the same. In still other forms, the fiducial marker 61 can be an RF beacon (e.g. a direction finding beacon) which assists in homing the robot 50 to the appropriate location, with an RF receiver or transceiver used as a fiducial detecting component 63. Combinations of the above can also be used. As will be appreciated, the fiducial detecting component 63 associated with guiding the robot toward the portal can also take on a variety of forms commensurate with the type of fiducial marker 61 used.

The fiducial marker 61 can serve not only the purpose of finding the appropriate stopping location for an inspection, but also the purpose of aligning the robot 50 to the switchgear to permit docking or insertion of a probe 56 (or the robot) into the interior of the switchgear 58. The robot 50 can be aligned with a switchgear 58 using any variety of techniques. One non-limiting embodiment of the robot 5 is such that the robot 50 can be mechanically registered to an enclosure of the switchgear 58. Such mechanical registration can take a variety of forms such as alignment of mechanical protrusions in one or both of the robot 50 and a structure such as the switchgear 58 that permit entry of the probe into the interior of the switchgear 58. Such structure can be a portion of the switchgear enclosure 60 itself, or a structure intended to permit location fixation of the robot 50 relative to the switchgear enclosure 60. Fixing the location of the robot 50 can be through mechanical interengagement techniques (e.g. protrusion of the robot through an aperture of the switchgear, among others), but can also merely provide a fixed position in which the robot 50 remains fixed in place while a probe 56 is deployed.

In the inspection embodiments herein the robot 50 can include a portal opening component 67 useful to unlock and/or open the portal 72A1. Such an opening component 67 can interact with complementary structure on the switchgear assembly, and in one form is akin to a key. The key can be a mechanical, magnetic, electronic, or any other type of suitable tool. In another nonlimiting example, the portal opening component 67 can be a leading edge of the robot that urges a spring loaded door to open when the robot 50 advances toward the portal. In still other forms the opening component 67 and complementary structure on the switchgear assembly can be designed such that it would be difficult for a technician or other person transiting the E-House to inadvertently open the portal. The portal opening component can be separately movable relative to a base of the robot 50, such as might include a moveable arm. The arm can be configured to translate, rotate, pivot, etc relative to the robot 50. In some forms the portal opening component 67 can include the probe 56.

The robot 50 can be structured to insert a probe 56 through an outer housing 60 of the switchgear 58 while electrical power is conveyed through the switchgear 58. In one form the switchgear 58 is housed behind a panel with a component of the switchgear located in an enclosure closed off by the panel (see panels 66, 68, and 70). Any number of panel/enclosure configurations can be used. In one non-limiting embodiment, the switchgear 58 can include a three panel, three enclosure setup, with different components of the switchgear occupying different enclosures closed off by respective panels. In some forms the panels can include a mechanism useful to permit opening of the panel for real-time inspection and/or servicing (e.g. a knob or latch) in which case the panel is the portal 72A1, while in other forms the portal 72A1 can be used to access the interior of the switchgear enclosure 60 without the need to open the panel.

The probe 56 can, but need not, be extendable from the robot 50. The probe 56 can be a telescoping assembly useful to deploy the probe 56 away from the robot 50. The probe 56 can be mounted on a rail system integrated into the robot 56. FIG. 4 illustrates a non-limiting embodiment of the robot 50 and probe 56. In some forms the probe 56 can be flexible to permit some amount of bending capability. The probe 56 can be deployed using any variety of techniques. For example, can be deployed using any type of actuation system such as, but not limited to, hydraulic, pneumatic, and electromagnetic, to set forth just a few non-limiting examples. In those embodiments in which at least a portion of the robot 50 remains in place and the probe 56 is deployed to its measurement position, the probe 56 can be extended and retracted at will, but in some forms the probe may be extended without provision to be recalled. While many embodiments of the robot 50 envision use of an extendable probe 56, some forms also contemplate that the probe 56 is not extendable but is rather moved into position by movement of the robot itself. For example, one embodiment of the robot 50 is structured to crawl into the switchgear enclosure 60 until it reaches an inspection location internal to the switchgear 58.

Whether the probe 56 is deployed from the robot 50, or is carried by the robot 50, the probe 56 is intended to be inserted into a data taking position 71. The data taking position 71 is intended in the embodiments herein to be a repeatable position from inspection to inspection, but such repeatability is not necessary. Such data taking position 71 can be pre-programmed, but can also be dynamically selected by a user and/or the robot 50 (or robot supporting system such as a base station). For example, the data taking position 71 can be determined by an initial inspection location of the robot 50 and/or an orientation of the probe 56. In those embodiments in which the robot 50 remains fixed in place and the probe 56 deployed (e.g. via extension of a telescoping arrangement), the data taking position can be dictated by the inspection station the robot has arrived at, coupled with any translation/rotation of the probe 56 as it is inserted into position within the switchgear enclosure 60. Other data taking positions are also contemplated, such as but not limited to simple translation of the robot 50 into the interior of a conduit. In some forms the data taking position 71 can also be dictated by natural mechanical interference with existing structure of the E-House. For example, the probe 56 can be routed through conduit such as a guide tube, the size/shape/configuration of which can produce a repeatable position and/or orientation of the probe 56. The regulation of the location and/or orientation of the probe can be facilitated through use of position and/or angle sensors (e.g. LVDT, RVDT, etc). It is envisioned that any location and/or component discussed herein can be accessible by the probe 56, and in some forms the robot 50 as well.

The repeatable nature of the data taking locations may include some nominal amount of error that will be understood to occur in systems of this nature. It is envisioned that manual data taking positions which are selected by interactive inspection of a technician can be recorded and used in later inspections if needed. Any number of data taking positions can be requested in the switchgear 58, and not all switchgear 58 in any given E-House need include the same number and types of data taking positions. Not all data taking positions need include every sensor. For example, a thermal image may be desired at many but not all locations in the switchgear 58.

Data collected using the probe 56 can be compared with historical data taken during prior robotic inspection, and/or compared with predictive data. The data can be stored local to the robot 50 for later download, it can be transmitted to a local monitoring/control station 73, or can be transmitted to a remote facility 75. The data can be transmitted using any variety of techniques, whether analog or digital transmission, wired or wireless, among other possible variations. Data in any variety can be captured such as photographs, video, and time history samples. The data can be stored raw on the robot 50 for transmission to a base station, or can be processed in some fashion on the robot 50 for later transmission or download. Any variety of other techniques of data processing and transmission/download are contemplated herein.

Figure 5:
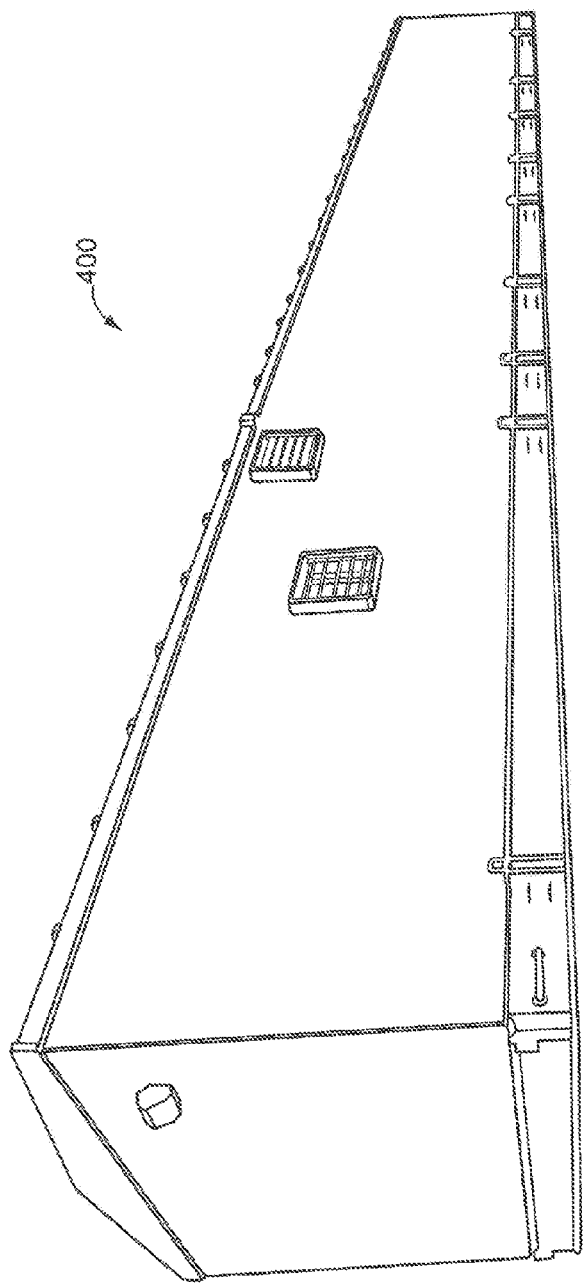
FIG. 5 illustrates some aspects of a non-limiting example of an electrical house (E-House) that may be inspected in accordance with an embodiment of the present invention.
Figure 6:
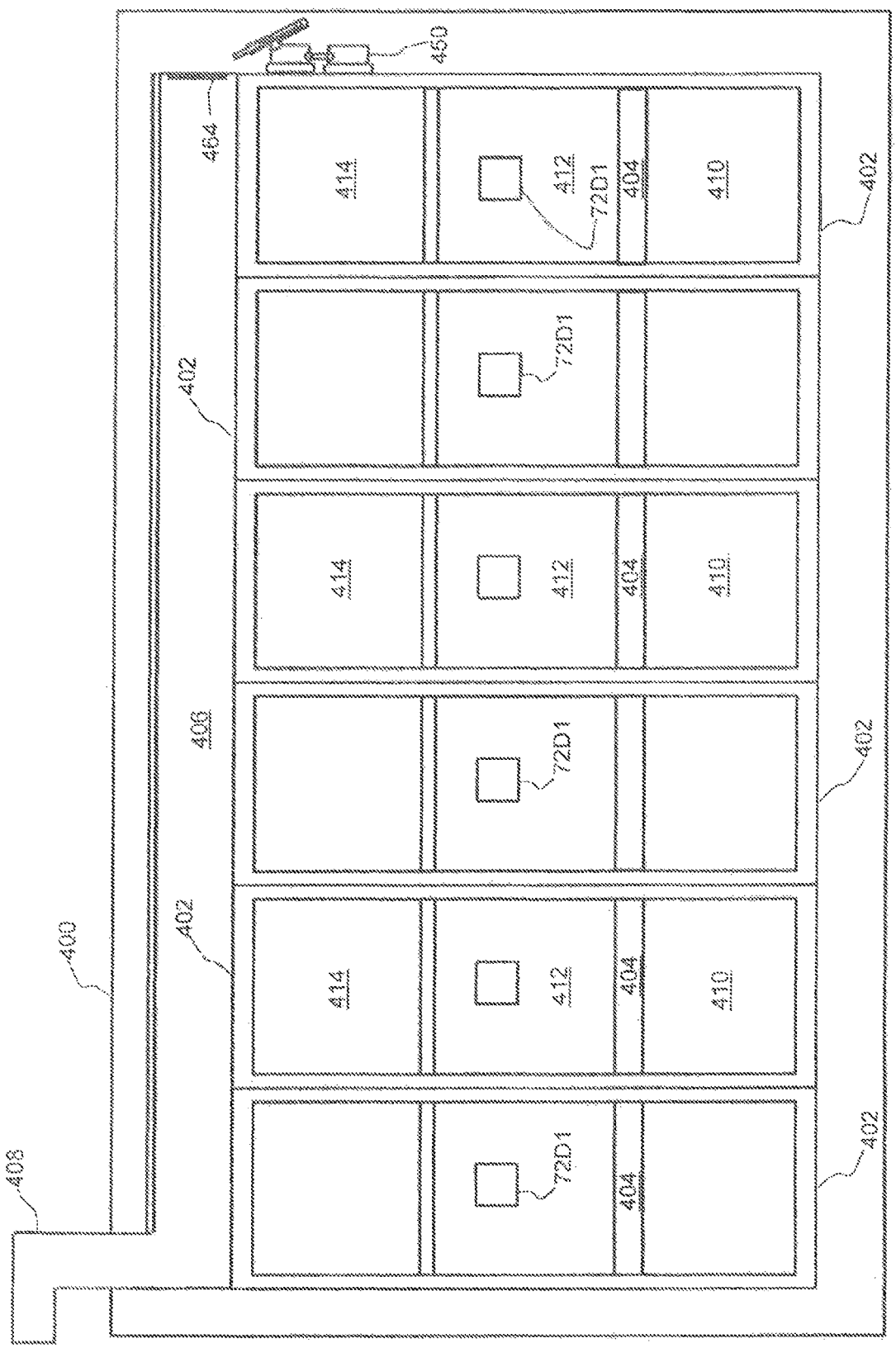
FIG. 6 schematically illustrates some aspects of non-limiting examples of switchgear systems in accordance with an embodiment of the present invention.

Referring to FIG. 5, some aspects of a non-limiting example of an electrical house or E-House 400, also known as a power house, is illustrated. With reference to FIG. 6, E-House 400 contains or houses, among other things, a plurality of switchgear systems 402, e.g., skid mounted, arranged side-by-side, some aspects of non-limiting examples of which are illustrated in accordance with an embodiment of the present invention. Each switchgear system 402 includes a switchgear enclosure 404 housing a plurality of switchgear components, examples of which are mentioned below. A conduit in the form of an arc duct 406 is coupled to switchgear enclosures 404 and extends between adjacent switchgear enclosures 404 to channel arc products during the occurrence of an arc event to a safe location, e.g., into a safe area (not shown) inside E-House 400 or through a chimney 408 or other discharge feature to exit E-House 400.

In one form, each switchgear enclosure 404 includes a bottom panel 410, a middle panel 412 and a top panel 414. In other embodiments, each switchgear component may have any number of panels. In one form, each panel (e.g., 410, 412, 414) is a door that may be opened in order to provide access to an internal compartment, e.g., a compartment within switchgear enclosure 404 in which switchgear components are located. In other embodiments, panels 410, 412 and 414 may be other types of access panels and/or may be control panels. In some embodiments, one or more panels may provide access to one or more switchgear compartments disposed inside of each switchgear enclosure 404, e.g., in which switchgear components are located. The number of switchgear compartments within each switchgear enclosure may vary with the needs of the application, e.g., and may be one or greater.

Figure 7:
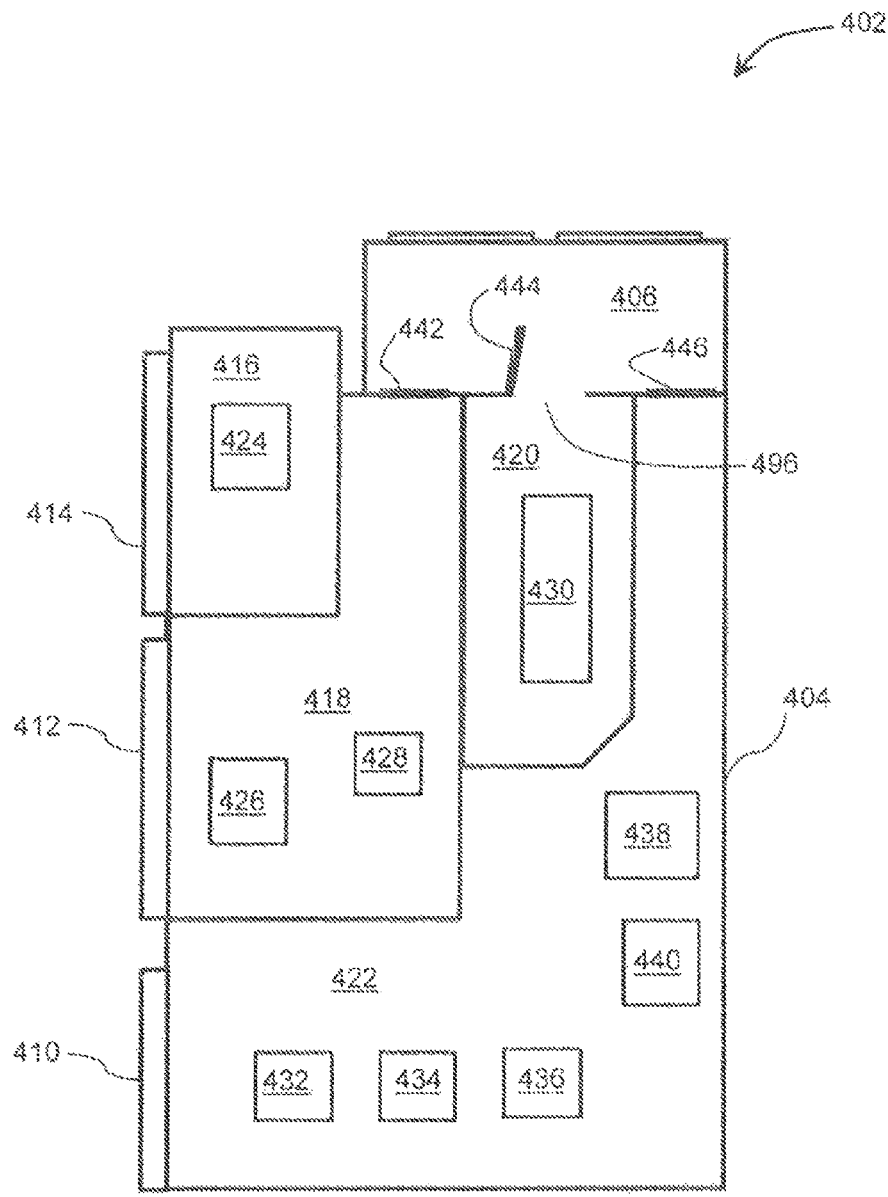
FIG. 7 schematically illustrates some aspects of a non-limiting example of a cross sectional side view of a switchgear system in accordance with an embodiment of the present invention.

Referring to FIG. 7, some aspects of a non-limiting example of a switchgear system 402 with switchgear enclosure 404 are schematically illustrated. In one form, switchgear system 402 is a medium voltage (MV) switchgear system, e.g., having an operating voltage between 1 kV and 52 kV, with an electrical current rating of up to 4000 A. In other embodiments, switchgear system 402 may have a greater or lesser maximum operating voltage and/or rated current, and may be, for example, a low voltage (LV) switchgear system, another MV switchgear system or a high voltage (HV) switchgear system. Switchgear system 402 includes a plurality of internal compartments, e.g., switchgear compartments, including a low voltage compartment 416, a circuit breaker compartment 418, a bus bar compartment 420 and a cable compartment 422. Other embodiments may include other compartments in addition to or in place of compartments 416, 418, 420 and 422.

Switchgear compartments 416, 418, 420 and 422 house a plurality of switchgear components. For example, low voltage switchgear compartment 416 houses, among other things, for example, protection relays and IEDs (intelligent electronic devices) 424 for providing protection, control, measurement and supervision, including power quality in some embodiments. In some embodiments, low voltage compartment 416 houses communication systems, e.g., for horizontal communications with other switchgear systems 402 in E-House 400, as well as other types of communications systems/protocols, e.g., network and/or Internet communications. Circuit breaker compartment 418 houses, among other things, a circuit breaker, e.g., a vacuum or SF6 insulated circuit breaker 426, and bus bar-side voltage transformers 428. Bus bar compartment houses, among other things, bus bars 430, e.g., one for each phase of the three-phase switchgear systems 402. Cable compartment 422 houses, among other things, cable and cable terminations 432; surge arrestors 434, core balance current transformers 436; cable-side voltage transformers 438 and measurement current transformers 440. Circuit breaker compartment 418, bus bar compartment 420 and cable compartment 422 are open to arc duct 406, e.g., via flaps 442, 444 and 446, respectively, which are vent flaps. In one form, flaps 442, 444 and 446 are louvered, slotted, slatted, latticed or otherwise open to permit the exhaust into arc duct 406 of air used to cool the respective switchgear components during normal operation. Flaps 442, 444 and 446 open during an arc event, e.g., based on a pressure differential during the arc event, to permit arc products to exit switchgear system 402 into arc duct 406. Flap 444 is depicted in the open position to allow robotic inspection of bus bar compartment 420 and bus bars 430, e.g., as described below. Although the illustrated embodiment places arc duct 406 on top of switchgear enclosures 404, it will be understood that in other embodiments, arc duct 406 may be disposed at another location, e.g., at the back of switchgear enclosures 404.

Referring to FIGS. 8 and 9, in conjunction with FIGS. 6 and 7, some aspects of a non-limiting example of a system 448 for inspecting one or more switchgear systems 402, e.g., disposed in E-House 400, are schematically illustrated in accordance with an embodiment of the present invention. System 448 includes an automated mechanism, e.g., a robot 450, and includes a probe 452, a controller 454 and an input device 456. Controller 454 is communicatively coupled to input device 456, robot 450 and probe 452 via communication links 458, 460 and 462, respectively, which may be, for example, bidirectional communication links, e.g., wired, wireless, optical, network, Internet or any other suitable forms of communication links. Although depicted as a unitary structure, it will be understood that controller 454 may be distributed across more than one location and/or platform, and may include, for example, a dedicated robotic controller, and/or one or more linked computers/controllers suitable for controlling and receiving data from robot 450 and probe 452, and for performing inspections, e.g., non-contact inspections of live switchgear components in switchgear enclosure 404 using, i.e., switchgear components 424, 426, 428, 430, 432, 434, 436, 438, 440 and/or any other switchgear components, operating under live voltage and current conditions, e.g., at rated voltage and current or other voltage and current values associated with live operation of switchgear systems 402.

In one form, robot 450 is a crawler, e.g., a robot that employs tracks or treads for creating motion of robot 450. In some embodiments, robot 450 may be a magnetic crawler that adheres to magnetic or ferrous alloys, which may be used to climb up the side of a switchgear enclosure 404, e.g., where the side is produced from a magnetic or ferrous alloy, e.g., as depicted in FIG. 6. In other embodiments, robot 450 may take other forms. In some embodiments, robot 450 is adapted to traverse the interior of arc duct 406 in order to perform inspection of switchgear systems 402 using probe 452. Robot 450 is operative to traverse along the interior of arc duct 406 to perform an inspection of each switchgear system 402 or only certain selected switchgear systems 402.

Robot 450 is adapted to enter arc duct 406, e.g., through an opening or robotic entrance 464 disposed at the end-most switchgear system 402 of the row or group of adjacent switchgear systems 402, in order to perform the inspections, e.g., under the direction of controller 454. In one form, opening 464 is a door. In a particular form, opening 464 is self-closing. For example, opening 464 may be operative to close after the entry of robot 450 into arc duct 406, e.g., in order to enhance arc safety. In some embodiments, robotic entrance 464 may be, for example, a trap door. In one example, a trap door may be spring loaded into a closed position, which may be pushed open by robot 450 or a robot 450 appendage once a safe zone in E-House 400 has been cleared of humans, or once humans have left E-House 400. In some embodiments, the trap door may be self-actuating, and may be opened under the direction of controller 454. In some embodiments, in order to enhance arc safety, robotic entrance 464 may be an "air lock" having an inner door and an outer door. In some such embodiments, for example, robot 450 may be placed in the air lock by opening the outer door and directing robot 450 into the air lock or manually placing robot 450 in the air lock, all the while the inner door remains closed in order to enhance arc safety. Once robot 450 is in the air lock, the outer door may be closed, after which the inner door may be opened in order to allow robot 450 to traverse the interior of arc duct 406 to perform the inspection of switchgear systems 402.

In some embodiments, robotic entrance 464 may include a robotic lift, e.g., a hoist or lift mechanism that is constructed to lift robot 450, e.g., from the floor level of E-House 400, to the level of arc duct 406. In some such embodiments the lift allows robot 450 to enter arc duct 406 without the necessity of robot 450 being constructed to climb up switchgear enclosures 404, or without the need for a human to lift robot 450 up to the level of arc duct 406. In some embodiments, a separate robot or manipulator may be employed to place robot 450 into arc duct 406, e.g., into an opening into arc duct 406, such as robotic entrance 464. Although robotic entrance 464 has been described as being above the side of arc duct 406, it will be understood that in various embodiments, robotic entrance 464 can be disposed at the front, back, or either side of arc duct 406 or switchgear enclosures 404.

In one form, robot 450 includes an arm 466 and a manipulator 468. In one form, manipulator 468 is operative to support probe 450. In one form, arm 466 is extendable/retractable, and is also pivotable about a pivot joint 470 in order to be able to manipulate probe 452 into a desired position for performing a non-contact inspection of live switchgear components. In other embodiments, robot 450 may include other appendages and features operative to manipulate probe 452 into position for performing an inspection of live switchgear components.

Probe 452 is mounted on robot 450, e.g., manipulator 468. Probe 452 includes a sensor package 472 constructed to perform non-contact inspections of live switchgear components inside switchgear enclosures 404 while switchgear systems 402 are live. In one form, sensor package 472 includes a plurality of non-contact sensors. For example, in some embodiments, sensor package 472 includes a gas sensor 474; an infrared camera 476, a thermal imager 478, a humidity sensor 480, an acoustic sensor 482, an ultrasonic sensor 484, a camera 486, e.g., a visual light camera or a visual sensor, a 3-D microphone system 488, a hyperspectral imaging camera 490 and a gas chromatography/mass spectrometry sensor 492. Gas sensor 474 and/or gas chromatography/mass spectrometry sensor 492 may be used, for example, among other things, for detecting gas leakage from gas insulated switchgear and/or detecting breakdown of switchgear component materials or other materials in or on switchgear enclosures 404. Some embodiments may also include a conventional microphone 494. Some embodiments may include other sensors in addition to or in place of the aforementioned sensors, or may include fewer sensors, which may or may not include one or more of the aforementioned sensors.

In various embodiments, robot 450 may have an autonomous mode, a semi-autonomous mode and a manual mode. In the autonomous mode, controller 454 controls robot 450 autonomously. In the semi-autonomous mode, controller 454 controls robot 450 in conjunction with human input from input device 456, e.g., but prevents human inputs that may have undesirable or catastrophic results, e.g., driving probe 452 into a live electrical component or another object. In another aspect of semi-autonomous mode, human inputs may be employed, e.g., to select components or features or locations sought to be inspected or to adjust or change automatic inspection parameters, to direct certain inspection procedures and/or provide other manual inputs. In manual mode, controller 454 controls robot 450 in response to human input via input device 456, and may be used, for example, to control robot 450 prior to the point of performing an inspection, e.g., to drive the robot to a desired location in preparation for an inspection operation, before autonomous or semi-autonomous operation begins. In one form, input device 456 is an input/output device, including a keyboard and a display. In other embodiments, input device 456 may take other forms.

Controller 454 is operative to control the robot 450 to move or traverse within arc duct 406, position probe 452 adjacent to an opening in the switchgear compartment, and operate sensor package 472 to perform a non-contact 27 inspection of switchgear components using sensor package 472, e.g., of bus bars 430 or other switchgear components via flaps 442 and/or 446. The opening may be, for example, opening 496 under flap 444, an opening under flap 442 or 446, an opening in one or more of flaps 442, 444 or 446, or another opening, e.g., a vent opening or a portal into a desired switchgear compartment, such as switchgear compartments 416, 418, 420 and/or 422. In some embodiments, robot 450 may extend, retract and/or rotate probe 452 in order to expose one or more desired sensors to the switchgear component being inspected and/or to perform the inspection from a desired location. Robot 450 may access or utilize one or more fiducials and/or mechanical registrations, e.g., mounted on, affixed to or integral with switchgear systems 402 or enclosures 404 or portals or openings thereon or therein, in order to position sensor package 472 at a desired fixed location for repeatability of inspections, e.g., in order to provide an accurate basis for comparing current, past and future inspection results. In some embodiments, controller 454 is operative to direct robot 450 to insert probe 452 into the switchgear enclosure 404 or one or more of the switchgear compartments 416, 418, 420, 422 via an opening, e.g., opening 496, while the switchgear system 402 is live, and to inspect one or more desired switchgear components in the switchgear compartments while the switchgear components are live.

Figure 10:
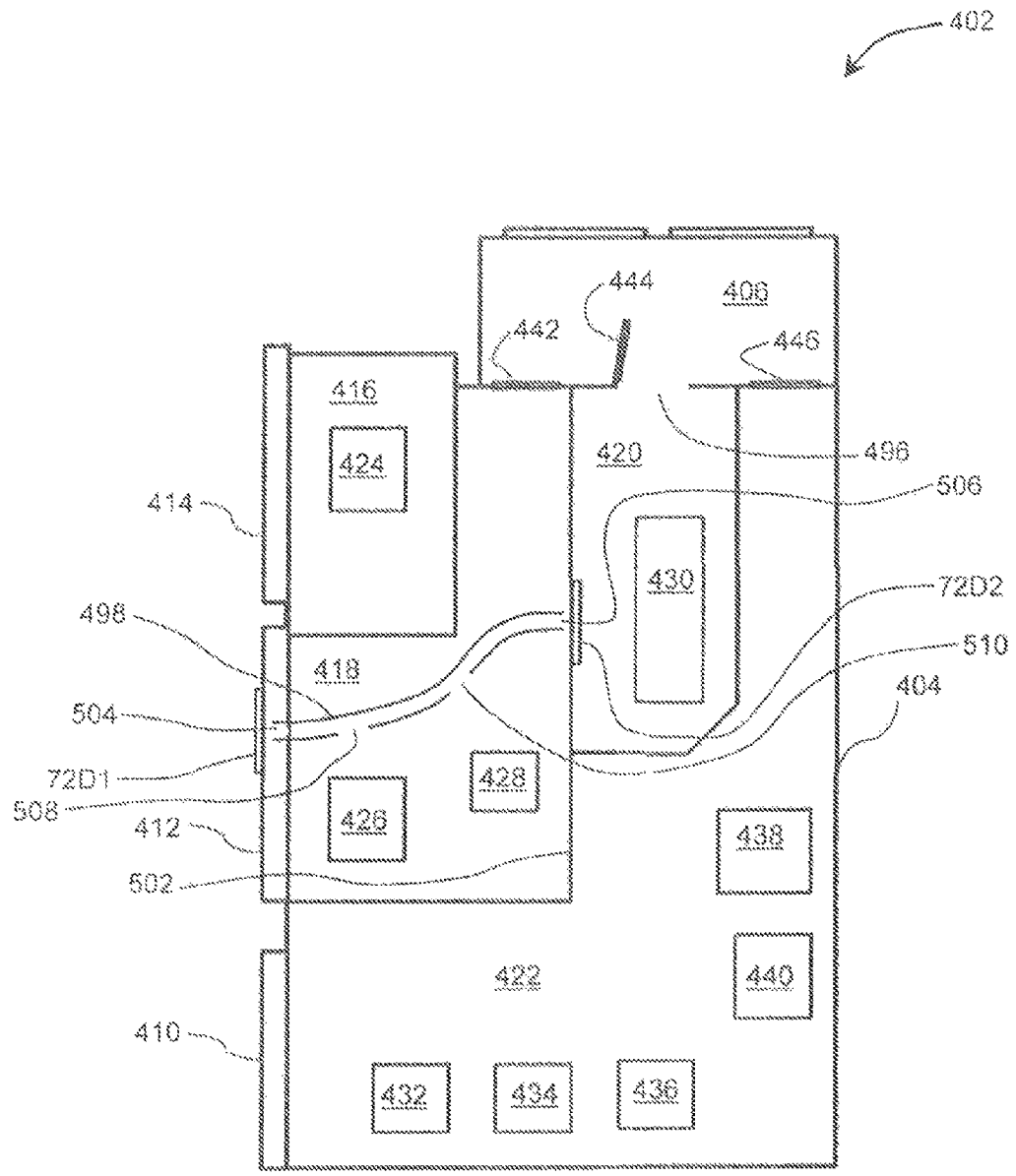
FIG. 10 schematically illustrates some aspects of a non-limiting example of a side view of a switchgear system in accordance with an embodiment of the present invention.

Referring to FIG. 10, some aspects of a non-limiting example of a side view of switchgear system 402 in accordance with an embodiment of the present invention is schematically illustrated. In the embodiment of FIG. 10, switchgear system 402 includes a conduit in the form of a guide tube 498, a portal 72D1 and a portal 72D2. Guide tube 498 is disposed and mounted within switchgear enclosure 404. Portal 72D1 is mounted in or on panel 412, and is constructed and operative to provide robotic access to circuit breaker compartment 418, when open. Portal 72D1 is constructed and operative to prevent access to circuit breaker compartment 418, as well as provide a degree of arc flash protection, when closed. The degree of arc flash protection may vary with the needs of the application. In other embodiments, portal 72D1 may be mounted elsewhere, and may be employed to provide access to other switchgear compartments in addition to or in place of circuit breaker compartment 418. Portal 72D1 is constructed to be opened by an automated mechanism, e.g., a robot, e.g., as described below. Portal 72D2 is constructed and operative to, when open, expose and provide access to bus bar compartment 420, e.g., from circuit breaker compartment 418, and is mounted on, for example, a common wall 502 or one or both of a pair of walls shared by or disposed between or delineating circuit breaker compartment 418 and bus bar compartment 420. When closed, portal 72D2 prevents access therethrough to bus bar compartment 420 from circuit breaker compartment 418. Although depicted as being disposed within circuit breaker compartment 418, it will be understood that one or more guide tubes may be disposed and mounted within any switchgear compartment within switchgear enclosure 404, e.g., any of switchgear compartments 416, 418, 420 and 422. In some embodiments, one or more guide tubes may extend between more than one switchgear compartment. Similarly, it will be understood that although portals 72D1 and 72D2 are operative to provide access to circuit breaker compartment 418 and bus bar compartment 420, respectively, in other embodiments, similar or other portals may be employed to provide access to any one or more switchgear compartments, whether from the front, top, sides, back or bottom of switchgear enclosures 404.

Portal 72D1 is constructed to provide robotic access, or more particularly, robotic probe 452 access to switchgear compartment 418, and in some embodiments to also or alternatively provide such access to guide tube 498. In one form, portal 72D1 is constructed to be opened by an automated mechanism, e.g., a robot, but not casually opened by a human, absent the use of tools or keys or the like that such as may be employed by a robot to open portal 72D1. In some cases, electrical connections from the automated mechanism or robot to the portal may be employed to supply power to a portal lock mechanism or a portal open/close mechanism to unlock or open portal 72D1, which connections may not casually or easily be duplicated by a human, e.g., absent specific intent to unlock or open the portal, which may limit human access to the switchgear compartments via the portal, thus providing a measure of arc safety. Some embodiments may require a coded signal or password to be supplied from the automated mechanism or robot to the portal in order to unlock or open the portal. By not being subject to casual opening by a human, arc safety is enhanced. Portals, such as might be employed as portal 72D1 are discussed further below.

Portal 72D1 provides access to switchgear compartment 418 (circuit breaker compartment 418) through panel 412 from the environment external to switchgear enclosure 404. Once portal 72D1 is opened, there is no barrier to the interior of the switchgear compartment, e.g., circuit breaker compartment 418, presented. Thus, an automated mechanism or robot, such as robot 450 or another robot or automated mechanism that supports or mounts probe 452 with sensor package 472, may perform an inspection, e.g., a non-contact inspection, of one or more live switchgear components disposed therein without any interference such as a barrier in any form may inadvertently provide. In some embodiments probe 452 and sensor package 472 may enter the switchgear compartment via portal 72D1. In some embodiments, the inspection may be of one or more live switchgear components disposed in an adjacent switchgear compartment, e.g., whether by access such as via portal 72D2 or the like, or whether by obtaining inspection data such as thermal imaging data, without accessing the second switchgear compartment directly. The non-contact inspections may be performed using, for example, sensor package 472 of probe 452.

In some embodiments, portal 72D1 provides access to an opening 504 in guide tube 498, e.g., an opening at a proximal end of guide tube 498. In some embodiments, guide tube 498 also has an opening 506, e.g., disposed at a distal end of guide tube 498. Guide tube 498 and probe 452 with sensor package 472 are both adapted to permit probe 452 with sensor package 472 to traverse from opening 504, along the interior of guide tube 498 to, and in some embodiments through, opening 506 of guide tube 498. For example, the robot may have a flexible arm that pushes probe 452 through a curbed guide tube 498, or an arm, flexible or rigid, that pushes probe 452 through a straight guide tube 498.

In one form, guide tube 498 has a circular cross section. In other embodiments guide tube 498 may have a square or any other cross sectional shape, or may be a U-shaped channel or a channel having any other cross sectional shape. The shape of guide tube 498 is complementary to the shape of probe 452 and sensor package 472, to permit probe 452 and sensor package 472 to traverse the interior of guide tube 498 in order to perform non-contact inspection of live switchgear components, e.g., while switchgear systems 402 are live. Controller 456 is operative to control the automated mechanism or robot, e.g., robot 450 or another robot or automated mechanism, to direct probe 452 through an opening (through portal 72D1, when open) and into the guide tube 498 while switchgear system 402 is live, and to operate sensor package 472 to inspect one or more switchgear components using sensor package 472 while switchgear system 402 is live.

In one form, guide tube 498 is rigid, and in some embodiments is constructed to enhance the repeatability of measurements, e.g., so that past, present and future inspection results may be compared. In one form, guide tube 498 is non-conductive. In one form, guide tube 498 is insulative, e.g., has dielectric strength sufficient to provide a desired hold-off voltage, e.g., measured in kV per millimeter of guide tube wall thickness, in order to prevent or reduce the likelihood of arcing between switchgear components, or between switchgear components and a robotic arm or manipulator or a probe and sensor package, such as probe 452 and sensor package 472.

Guide tube 458 is constructed to position sensor package 472 at a desired location within the switchgear enclosure/compartment. In one form, guide tube 498 includes a window 508 and a window 510. In one form, windows 508 and 510 are open, e.g., barrier-free, presenting no barrier, glass, composite or otherwise, between the interior of guide tube 498 and circuit breaker compartment 418. In some embodiments, one or more windows may include a barrier, such as a glass or polymeric pane. Windows 508 and 510 are adapted to expose sensor package 472 to the switchgear components sought to be inspected, e.g., circuit breaker system 426 and voltage transformers 428, and allow sensor package 472 to "view" the switchgear components from repeatable viewing positions while performing the inspections, e.g., non-contact inspections. Accordingly, windows 508 and 510 face circuit breaker system 426 and voltage transformers 428 to permit non-contact inspection of circuit breaker system 426 and voltage transformers 428 by sensor package 472. It will be understood that circuit breaker system 426 and voltage transformers 428 are used by way of example only; in various embodiments, the guide tube and windows may be constructed and adapted to permit non-contact inspection of any desired switchgear component using sensor package 472 of probe 452. Guide tube 498 and windows 508 and 510 are constructed to position probe 452 and sensor package 472 in a repeatable manner, so that inspection results from past, present and current inspections may be compared, and the status and/or change of status of the switchgear components determined.

In some embodiments, opening 506 of guide tube 498 is positioned adjacent to and facing portal 72D2. The automated mechanism or robot may thus use an arm or manipulator to open portal 72D2 so that an inspection, e.g., a non-contact inspection, of the adjacent switchgear compartment and switchgear components located therein may be subject to a non-contact inspection. In some embodiments, probe 452 may be used to push portal 72D2 into the open position. In some embodiments, because portal 72D2 is located inside of switchgear compartment 404, portal 72D2 may be constructed for opening without the necessity of using tools or other features to prevent casual human opening of the portal. Opening 506 of guide tube 498 is adapted to pass probe 452 and sensor package 472 therethrough into the adjacent switchgear compartment, e.g., bus bar compartment 420, for inspecting switchgear components located therein, e.g., bus bars 430. In some embodiments, probe 452 and sensor package 472 may be extended, retracted and/or rotated in order to expose particular sensors to the switchgear components sought to be inspected through windows 508 and 510 or opening 506 and/or to position probe 452 and sensor package 472 at a desired location in order to perform the inspection.

Although the embodiment of FIG. 10 employs guide tube 498 as a conduit across circuit breaker compartment 418 from portal 72D1 to portal 72D2, in other embodiments, a pathway between portals 72D1 to 72D2, e.g., through air, as opposed to a mechanical conduit, may be employed. For example, a pathway between portals, such as a non-obstructed path between portals 72D1 and 72D2 may be employed. In some embodiments, such a pathway might be lie directly between portals 72D1 and 72D2, e.g., linearly, depending upon the locations of switchgear components within the switchgear compartments, in which case the space between portals 72D1 and 72D2 may be traversed by controller 454 directing probe 452 with sensor package 472 directly from portal 72D1 to portal 72D2 to open portal 72D2 without the use of a mechanical conduit. In some embodiments, the pathway may be curvilinear. In some embodiments, controller 454 may direct probe to perform an inspection of switchgear components, e.g., bus bars 430 in bus bar compartment 420, via portal 72D2. The inspection may be performed, for example, by viewing bus bars 430 from circuit breaker compartment 418 through portal 72D2 using sensor package 472, or by directing probe 452 with sensor package 472 to enter portal 72D2 to perform the inspection, e.g., a non-contact inspection, from one or more closer vantage points.

Referring to FIG. 11, some aspects of a non-limiting example of an automated mechanism, e.g., a robot 500 or other automated mechanism for performing an inspection through portal 72D3 in accordance with an embodiment of the present invention is schematically depicted. Although some embodiments are described herein above and below as including robots, it will be understood that in various or other embodiments, other forms of automated mechanisms may be employed in place of robots, and that in other embodiments, automated mechanisms may include robots and other mechanisms that are programmable, programmed, or the like, which in some embodiments may include autonomous, semi-autonomous and/or manual operating modes, and may be operated via a computer or controller alone or in conjunction with input from a human. Portal 72D3 is constructed to be opened by robot 500. Portal 72D3 is constructed and operative to provide access to switchgear enclosure 404 when opened, i.e., access to the interior of switchgear enclosure 404, e.g., circuit breaker compartment 418 or one or more other switchgear compartments, and to prevent access to the switchgear compartment(s) when closed. In some embodiments, portal 72D3 may be constructed for automatic closing, e.g., after withdrawal of the robot from the portal. Robot 500 is configured to perform an inspection, e.g., a non-contact inspection, of a live switchgear system 402 using probe 452 with sensor package 472, e.g., under the direction of controller 454, and some cases, with input from input device 456. In some embodiments, the inspection may be performed using guide tube 498 as described above, whereas other embodiments may not use a guide tube. Robot 500 may be the same as or similar to robot 450, or may take a different form. Robot 500 is coupled to controller 454, and supports probe 452 with sensor package 472 via one or more appendages, e.g., an arm and a manipulator. Robot 500 is operative to perform an inspection of live switchgear components of switchgear systems 402 via portal 72D3, which may be the same as or similar to portal 72D1, for example.

Portal 72D3 is disposed on switchgear enclosure 404. In one form, portal 72D3 is disposed on the exterior of switchgear enclosure 404. In other embodiments, one or more portals may be disposed in the interior of switchgear enclosure 404. In one form, portal 72D3 is disposed on panel 412, although in other embodiments, portal 72D3 may be disposed on any wall, e.g., external side, top or bottom wall, or door or panel of switchgear enclosure 404. Portal 72D3 is operative to be opened in conjunction with the use of an access member 512 mounted on, affixed to or supported by robot 500, e.g., a manipulator of robot 500.

Portal 72D3 includes one or more doors 514, one or more access members 516, and one or more mechanical registration features 518. The mechanical registration features 518 are constructed to provide mechanical registration of the position of a robotic feature or automated mechanism feature, i.e., a mechanical feature of or associated with the automated mechanism performing the inspection, e.g., robot 500, for example, a manipulator, arm, or other appendage of robot 500; access member 512; or a dedicated robot 500 or other automated mechanism mechanical registration feature or tool. Some embodiments include one or more springs 520 constructed to bias door(s) 514 toward a closed position or to close door(s) 514.

Some embodiments include a lock 522 operative to prevent door(s) 514 from opening, i.e., until unlocked by robot 500 using one or more features of access member 512. In some embodiments, lock 522 may be an electrically actuated locking mechanism operative to lock door 514; and operative to unlock door 514 when access member 516 is supplied with an electrical signal from access member 512, which may be constructed to, among other things, supply the electrical signal. The electrical signal supplied from access member 512 to access member 516 may be, for example, a power signal, e.g., a 12 Vdc power supply, or may be a control and/or communication signal of any suitable sort, including wired, wireless and optical signals using any suitable protocol. Some embodiments may include an electrically actuated door opening mechanism 524, e.g., a motorized door opening mechanism. The electrically actuated door opening mechanism 524 may be operative to open door 514, e.g., when the access member 516 is supplied with an electrical signal from access member 512, e.g., an electrical signal as described above with respect to lock 522. Portal 72D3 is constructed and operative to provide access to one or more switchgear compartments, e.g., circuit breaker compartment 418, when door(s) 514 is open, and to prevent such access when door(s) 514 is closed.

Robot 500 access member 512 is constructed to engage access member 516. Access member 512 may be gripped by, mounted on, affixed to or otherwise supported by a manipulator or other appendage 526 of robot 500, which may also support probe 452 with sensor package 472 in some embodiments. Portal 72D3 is constructed to be opened by robot 500 using access member 512. Access member 516 and access member 512 cooperate to manually or automatically open door(s) 514, and in some cases to unlock lock 522, under the impetus or action of access member 512. For example, in some embodiments, a translation and/or rotation of access member 512 while engaging or engaged with access member 516 may be employed as the impetus or action; and/or the making of an electrical connection between access members 516 and 512; and/or the sending of an electronic signal from access member 512 to access member 516, e.g., depending upon the nature of access members 516 and 512.

Access member 512 may be, for example, a tool, a key, a power supply, a communication link or connection that is constructed to engage corresponding and complementary access member 516 to allow robot 500 to open or direct the opening of portal 72D3, e.g., door(s) 514. Access member 512 and access member 516 are constructed to inhibit a human's ability to casually or accidentally or inadvertently open portal 72D3, by requiring specific intent to open the door(s) 514, e.g., the specific intent being manifested by the intentional acquisition and manipulation of an access member 512 by a human, which in some embodiments is intended to be not readily available to human operators. For example, in order for a human to access portal 72D3, the human would have to secure and manipulate an access member 512 or another mechanism constructed to engage access member 516, in conjunction with access member 516, to unlock and/or open portal 72D3. Access members 512 and 516 thus contribute to arc safety by preventing or reducing the likelihood of an inadvertent human opening of portal 72D3. In some embodiments, humans vacate E-House 400 prior to the robot opening the portal, thus further contributing to arc safety.

Once portal 72D3 is open, robot 500 is free to perform an inspection of live switchgear components inside switchgear enclosure 414, either by exposing probe 452 and sensor package 472 to, e.g., line-of-sight viewing of switchgear components through the open door(s) 514, or by inserting probe 452 and sensor package 472 into switchgear enclosure 404 through portal 72D3, e.g., into circuit breaker compartment 418. Inspection of additional switchgear components may be performed by opening an interior portal, such as portal 72D2, thus providing access to another switchgear compartment, e.g., circuit breaker compartment 420.

In the present description and in the drawings, reference characters having an alpha character in the $3^{rd}$ or $4^{th}$ position from the left relate to the same or corresponding elements or features as described, e.g., with respect FIG. 11, with reference to the same numeric portion of the reference character, and unless otherwise indicated herein or otherwise made obvious to one of ordinary skill in the art, the same description of the element or feature applies. Thus, by way of example, reference character 514A in the embodiment of FIGS. 12A-12D relates to door(s) 514 described above with respect to FIG. 11, and unless otherwise indicated herein or otherwise made obvious to one of ordinary skill in the art, the same description set forth above with respect to doors 514 applies to doors 514A.

Figure 12B:
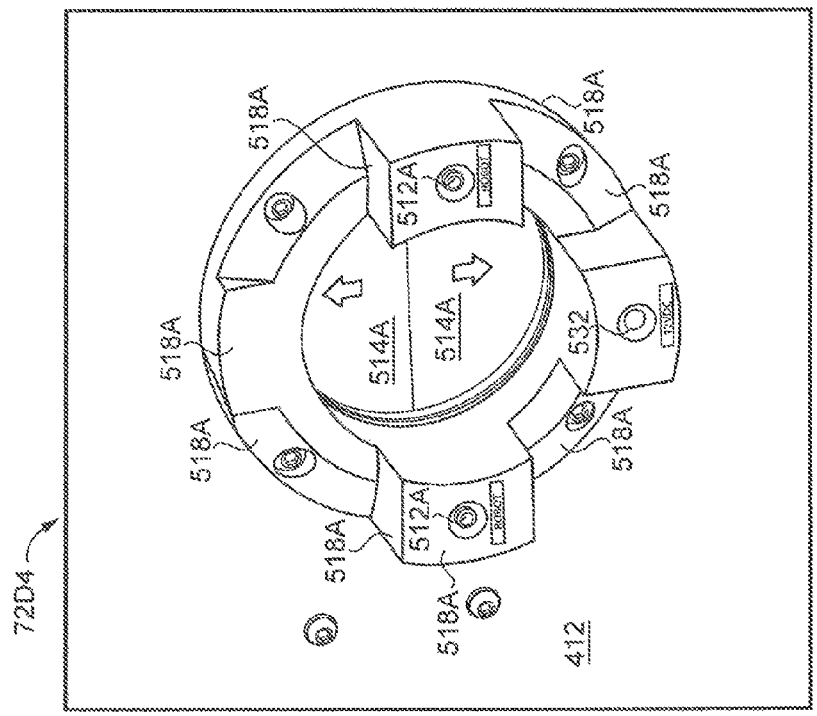
FIGS. 12A-12D illustrate some aspects of a non-limiting example of a portal constructed to be opened by a robot in accordance with an embodiment of the present invention.
Figure 12A:
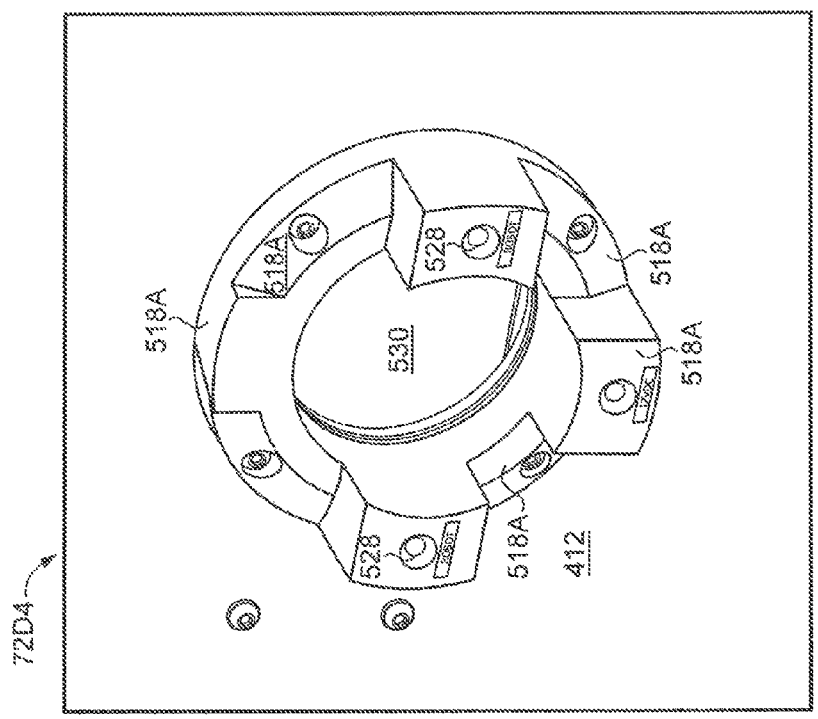
Figure 12D:
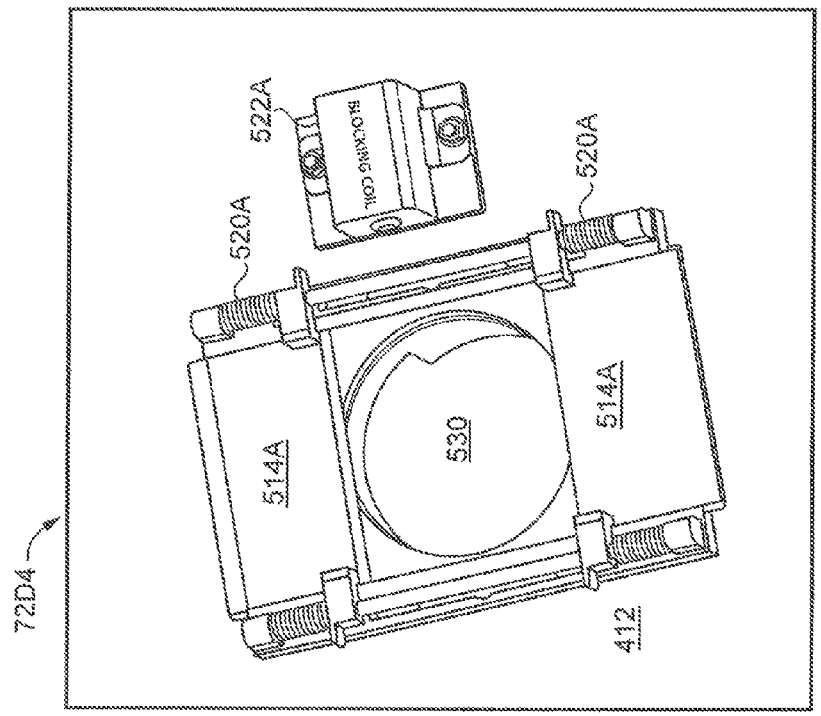
Figure 12C:
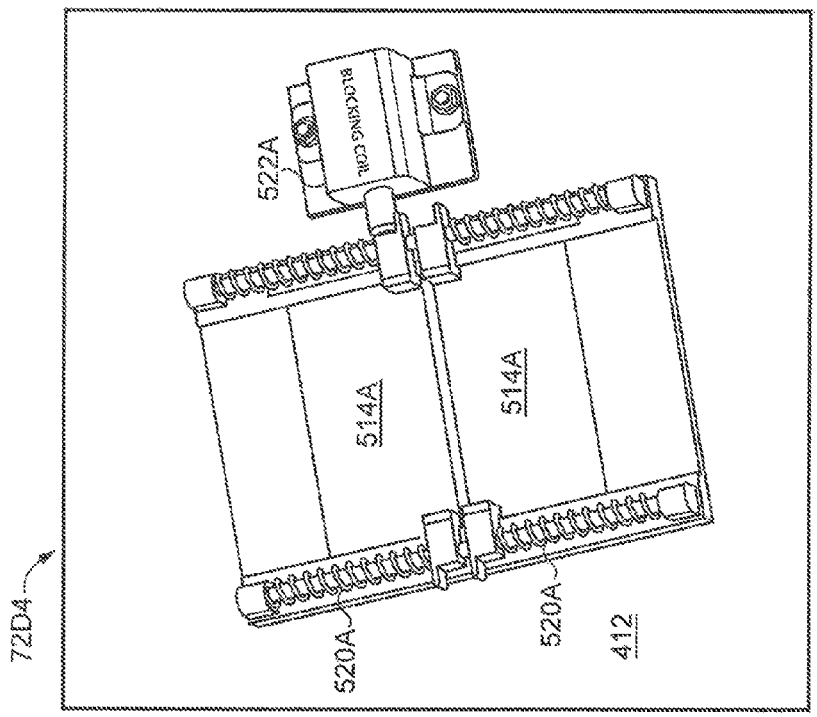

Referring to FIGS. 12A-120 in conjunction with FIG. 11, some aspects of a non-limiting example of a portal 72D4 in accordance with an embodiment of the present invention is illustrated. FIG. 12A depicts a front view of portal 72D4 in the open condition; FIG. 12B depicts a front view of portal 72D4 in the closed condition; FIG. 12C depicts a back view of portal 72D4 in the closed condition; and FIG. 12D depict a back view of portal 72D4 in the open condition.

Portal 72D4 includes at least some of the features mentioned above with respect to portal 72D3. The description of portal 72D1 applies equally to portal 72D4. Portal 72D4 includes access members 516A in the form of pins disposed in openings 528 that may be depressed by access members 512 on robot 500 in the form of pins that fit into openings 528. Translation of access members 516A under the impetus or action of access members 512, e.g., as driven by manipulator 526, actuates a four-bar linkage mechanism (not shown), that slides doors 514A apart to open portal 72D4, yielding an opening 530 through portal 72D4. Surface features 518A of portals 72D4 may be constructed as mechanical registration features that provide mechanical registration of a robotic feature, e.g., so that probe 452 and sensor package 472 may be repeatably positioned by robot 500 for inspection of switchgear components. Springs 520A bias doors 514A toward the closed position, and are operative to close doors 514A after the removal of access members 512 from openings 528. Lock 522 is an electrically actuated locking mechanism operative to lock doors 514A, and to unlock doors 514A when a feature of access member 516 in the form of an electrical pin connector 532 is supplied with 12 Vdc from access member 512.

Figure 13B:
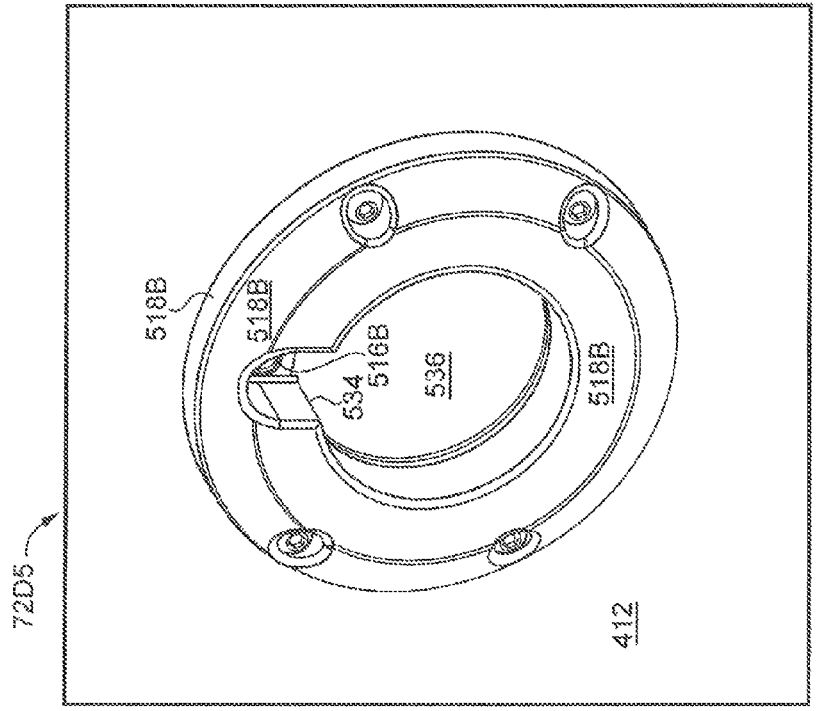
FIGS. 13A-13D illustrate some aspects of a non-limiting example of a portal constructed to be opened by a robot in accordance with an embodiment of the present invention.
Figure 13A:
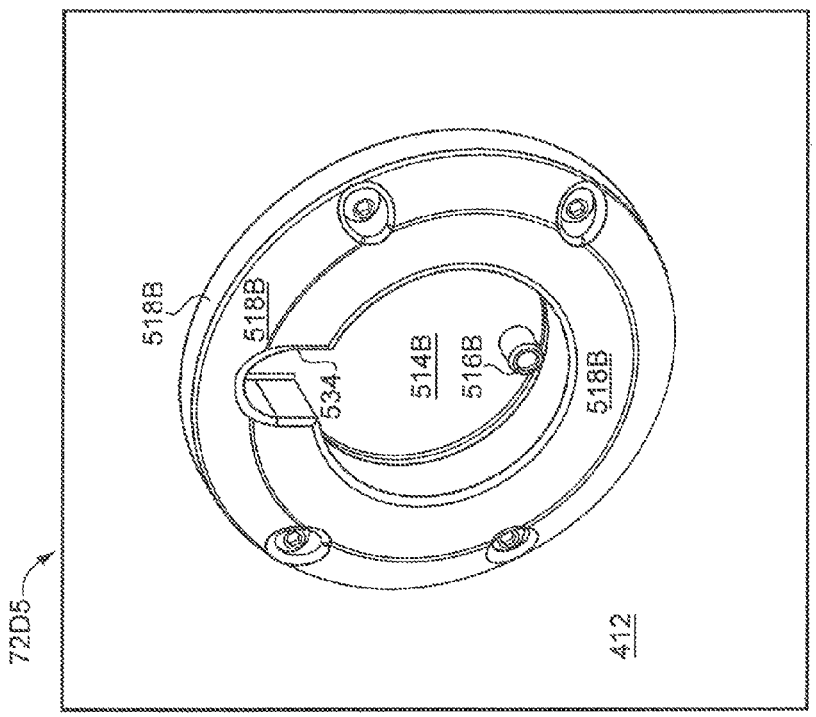
Figure 13C:
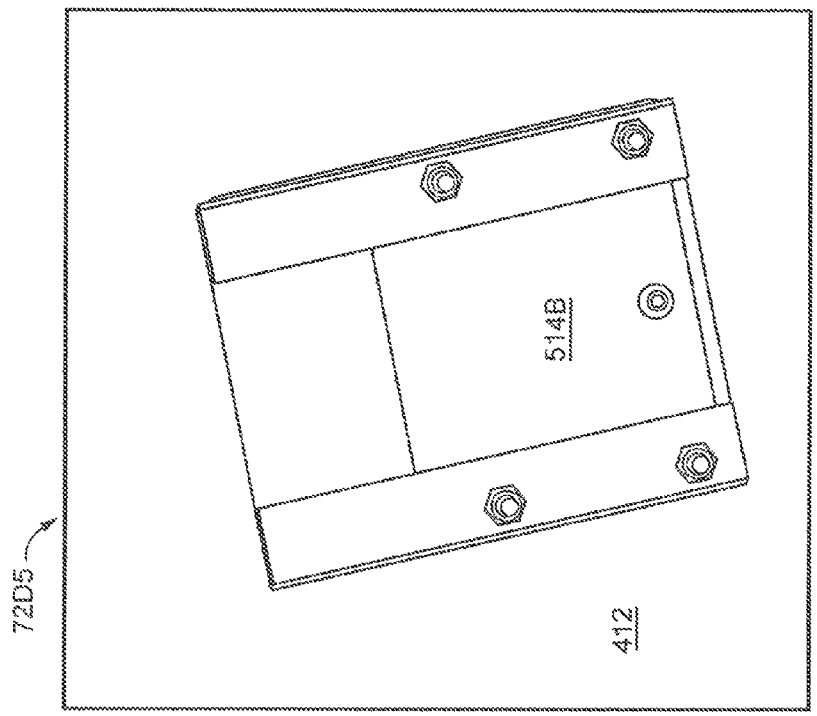
Figure 13D:
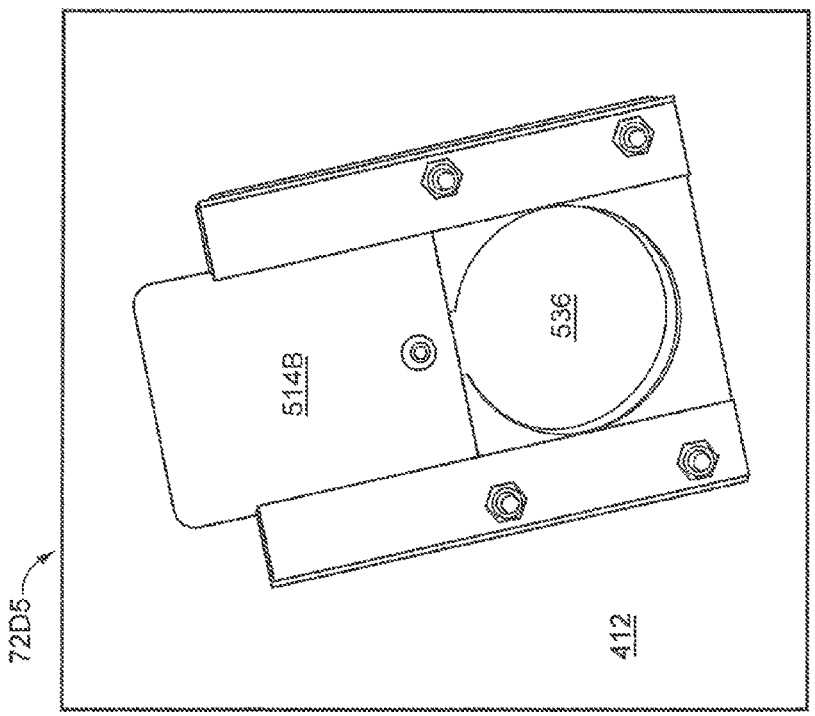

Referring to FIGS. 13A-13O in conjunction with FIG. 11, some aspects of a non-limiting example of a portal 72D5 in accordance with an embodiment of the present invention is illustrated. FIG. 13A depicts a front view of portal 72D5 in the closed condition; FIG. 13B depicts a front view of portal 72D5 in the open condition; FIG. 13C depicts a back view of portal 72D5 in the open condition; and FIG. 13D depicts a back view of portal 72D5 in the closed condition.

Portal 72D5 includes at least some of the features mentioned above with respect to portal 72D3 and portal 72D2. The description of portal 72D1 applies equally to portal 72D5. Portal 72D5 includes access member 516B in the form of a pin that may be grasped by access member 512 on robot 500 in the form of a socket that covers all or a portion of the protruding pin 516B. In some embodiments, pin 516B has a shape that is more difficult to grasp without rigidly mounted access member 512, e.g., a curved, low profile protrusion. It will be understood that the shape of the illustrated pin 516B is for the sake of clarity of illustration. Translation of access member 516B under the impetus or action of access member 512, as driven by manipulator 526, e.g., in the vertical direction toward slot 534, slides door 514B upward to open portal 72D5. The opening of door 514B yields an opening 536 through portal 72D5. One or more of surface features 518B of portals 72D5 may be constructed as mechanical registration features that provide mechanical registration of a robotic feature, e.g., so that probe 452 and sensor package 472 may be repeatably positioned by robot 500 for inspection of switchgear components. Door 514B may be closed by translating access member 516B in the downward direction away from slot 534 using access member 512. Some embodiments may include springs to bias doors 514B toward the closed position, and to close doors 514B after the removal of access member 512 from access member 516B.

Figure 14B:
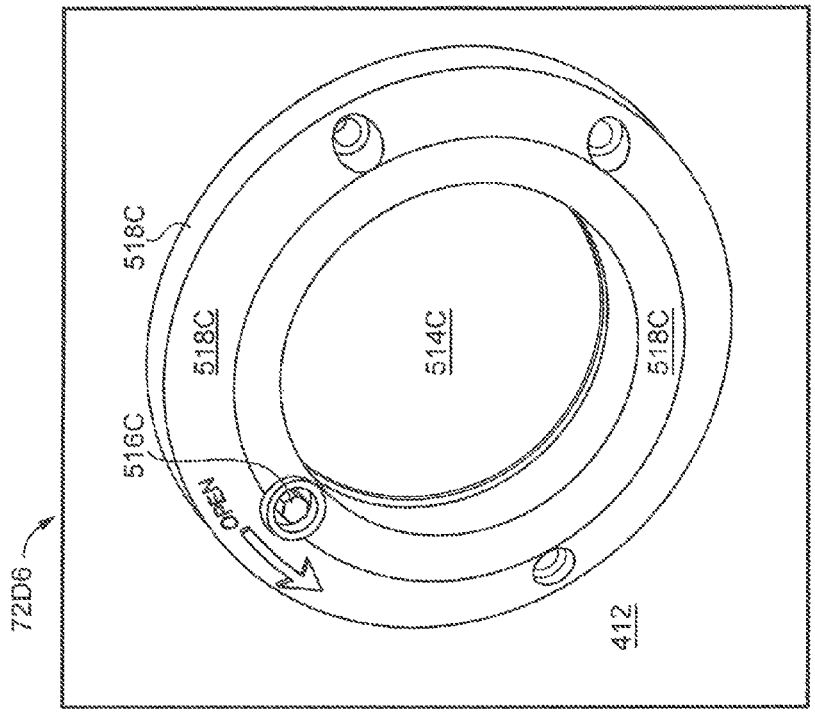
FIGS. 14A-14D illustrate some aspects of a non-limiting example of a portal constructed to be opened by a robot in accordance with an embodiment of the present invention.
Figure 14A:
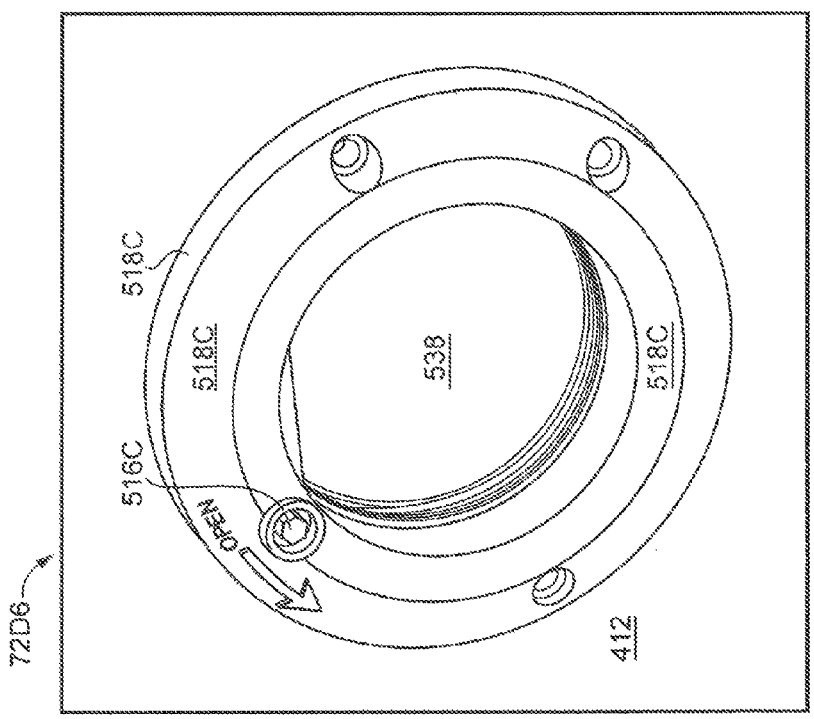
Figure 14D:
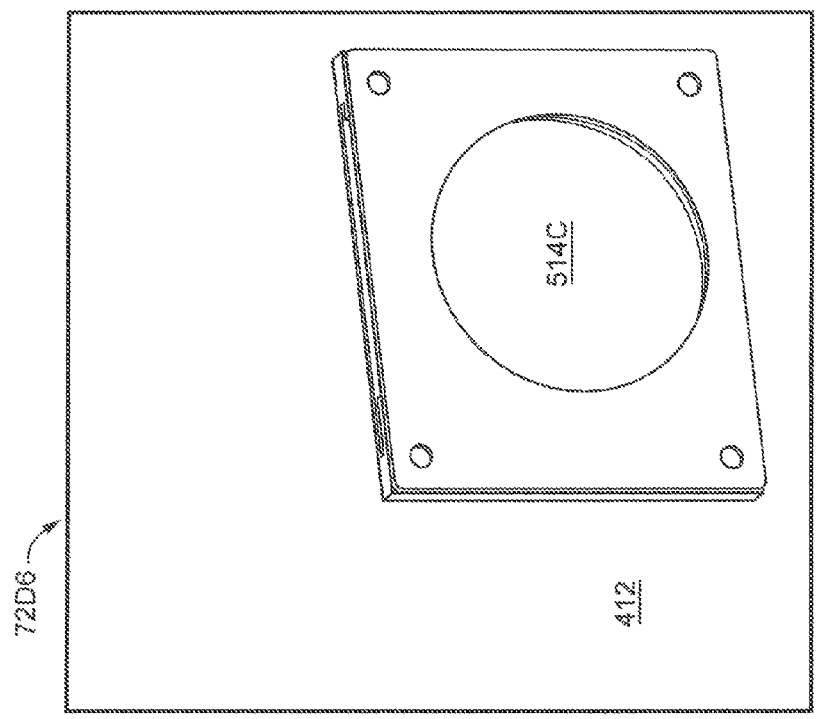
Figure 14C:
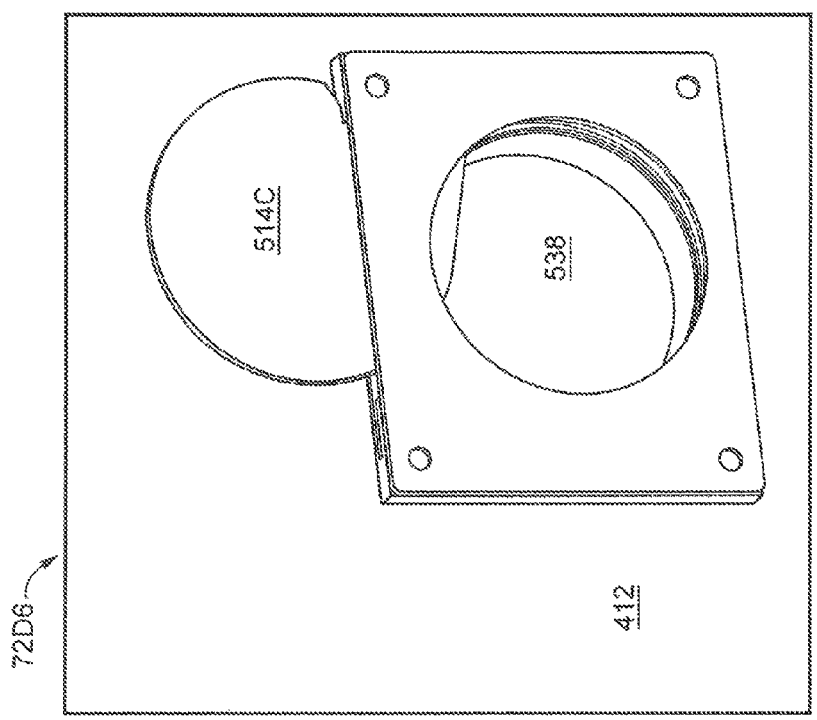

Referring to FIGS. 14A-14D in conjunction with FIG. 11, some aspects of a non-limiting example of a portal 72D6 in accordance with an embodiment of the present invention is illustrated. FIG. 14A depicts a front view of portal 72D6 in the open condition; FIG. 14B depicts a front view of portal 72D6 in the closed condition; FIG. 14C depicts a back view of portal 72D6 in the open condition; and FIG. 14D depicts a back view of portal 72D6 in the closed condition.

Portal 72D6 includes at least some of the features mentioned above with respect to portal 72D3 and portal 72D2. The description of portal 72D1 applies equally to portal 72D6. Portal 72D6 includes access member 516C in the form of a hex key that may be grasped by access member 512 on robot 500 in the form of a socket that engages hex key 516C. The size of hex key 516C may be nonstandard, so that a conventional socket tool is unable to rotate it. In other embodiments, key 516C may have a different shape. Rotation of access member 516C under the impetus or action of access member 512 as driven by manipulator 526, e.g., in the counterclockwise direction, slidingly rotates door 514C upward to open portal 72D6. The opening of door 516C yields an opening 538 through portal 72D6. One or more of surface features 518C of portals 72D6 may be constructed as mechanical registration features that provide mechanical registration of a robotic feature, e.g., so that probe 452 and sensor package 472 may be repeatably positioned by robot 500 for inspection of switchgear components. Door 514C may be closed by rotating access member 516C in the clockwise direction using access member 512. Some embodiments may include springs to bias doors 514C toward the closed position, and to close doors 514C after the removal of access member 512 from access member 516C.

A high resolution camera may be positioned within an E-House to capture a high resolution image of a region of interest (ROI). A high resolution image typically includes at least five megapixels or greater. In a preferred form the high resolution image can be greater than ten megapixels. The high resolution image can be a color image or a black and white image with a large grey scale resolution.

In some forms the high resolution camera may be conveyed into an E-House through one or more of the portals, such as those described in FIGS. 11-14D. A robot, such as robot 50 described above, may be used in some embodiments to convey the high resolution camera through a portal in a predetermined location so as to capture a high resolution optical image of a region of interest (ROI). In other forms the high resolution camera may be positioned within the E-House in a permanent or semi-permanent manner with or without the assistance from a robot. In some embodiments, the high resolution camera may be held in a fixed location during operation of the electric apparatus within the E-House. In other embodiments, the high resolution camera may be movable within the E-House during operation of the electric apparatus. An internal maneuvering apparatus may be operably coupled to the high resolution camera for moving the high resolution camera to a desired location and angular orientation within the E-House. The maneuvering apparatus may have portions that extend and contract in a linear direction, articulating portions that are rotatable into various angular orientations, and/or other movable features operable to position the high resolution camera in a desired location and angular orientation within the E-House. An electronic controller may be operably coupled to the maneuvering apparatus to control movement of the maneuvering apparatus. Regardless of whether a robot is used or an internal maneuvering apparatus is used to position the camera within the E-House, the camera may be moved to different depths and rotated at different angles as necessary to capture a desired image of an ROI.

An ROI may include, but is not limited to a region having electronic components, electrical connectors, insulation surfaces, or other components of a switchgear or other electrical apparatus in an E-House. A first high resolution image of an ROI is captured as a baseline image when the apparatus in the E-House is new or recently cleaned and/or had maintenance operations performed thereon. The first high resolution image can be stored in a memory and can be analyzed in real time or recalled at a later time by an electronic controller. A second high resolution image of the same ROI is captured at a subsequent time. The second high resolution image can be stored in a memory and can be analyzed in real time or recalled at a later time by an electronic controller. The first and second high resolution images of the same ROI can be compared through automatic analysis by dedicated computer programs. For example, an edge detection algorithm can be run to determine if a change in edge location of a certain feature has occurred in the ROI by analyzing the same feature in the first and second images. An edge detection algorithm can be used for such things as detecting possible deterioration of an insulator surface or the like. It should be understood that first image and second image may if fact be a plurality of first images and a plurality of second images that are taken contemporaneously and electronically combined or stitched together to define a first image and a subsequently taken second image.

The controller can perform a pixel by pixel comparison of the first and second images and determine color variation, grey scale variation, a pattern or a change in pattern, a shape or a change in shape when analyzing the first and second images.

In one form the ROI can be a horizontal surface. The horizontal surface may be imaged at a new, cleaned or reconditioned state of the component within the E-House to set a baseline and then later images can be used to detect such things as dust collection, grime and/or corrosion or the like that has collected on the surface. In another form the ROI can be a vertical surface. The vertical surface may be imaged at a new or refurbished state of the component within the E-House to set a baseline and then later images can be used to detect contaminants such as moisture or tree-like structures that have built up on insulator surfaces or the like. Other surfaces that are not horizontal or vertical may also be captured and analyzed. The color change between the images can indicate presence of foreign material or component degradation. If a percentage of changed pixels exceeds a preset threshold, an analysis algorithm can issue a warning signal or an alarm with an indication of the level of change.

In some forms an ROI can include an insulation surface. An insulation surface can be defined by a continuous area of pixels having the same color or shade on the reference or first image. If the continuous area of pixels changes over time an edge detection algorithm can be used by the controller to analyze second or subsequent images of the insulation surface. If an edge is detected an alarm can be triggered as a possible indicator of a deteriorating surface due to partial electrical discharges on the insulation surface.

In some forms an ROI can include primary circuit insulation. The primary circuit insulation can be defined by a continuous area of pixels having the same color or shade on the reference or first image. By way of example and not limitation, all neighboring pixels of a specific color or shade may be identified as a copper bar covered by insulation. The area of the pixels representing one primary circuit from the first image can then be compared with a second image. If a pixel is identified that has a change in color, then neighboring pixels are checked for a color change. This analysis will continue until the baseline pixels of the first image and the current state pixels in the second image substantially match in color. The area of color change can define an edge or slot that may indicate a fault in the primary circuit. If an edge is detected an alarm can be triggered as a possible indicator of a deteriorating surface due to partial electrical discharges on the surface. A warning or alarm may signal that a possible rupture has occurred in the primary circuit insulation.

Automatic analysis requires that the images are taken in a repeatable way. The image must be taken at same location i.e. at the same distance, same angular orientation each time the image is taken which can be over a period of several years. Furthermore, artificial illumination of the scene must be similar between the images so as to avoid differences caused by variations in lighting intensity and lighting incidence angles.

Figure 15:
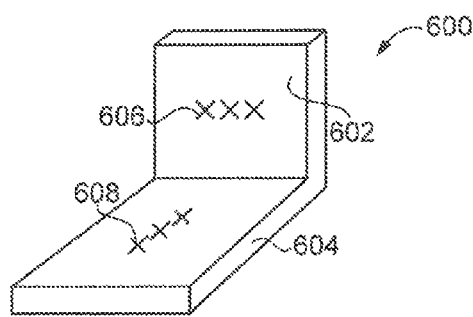
FIG. 15 illustrates a structure having a vertical surface and a horizontal surface.

FIG. 15 illustrates a structure 600 having a vertical surface 602 and a horizontal surface 604. The structure 600 can be an electrical apparatus or a portion of an electrical apparatus in an E-House. Representative fault indicators 606, 608 on the vertical surface 602 and the horizontal surface 604, respectively can be captured with an optical image and analyzed by the controller. The controller will make a determination as to whether the indicators 606, 608 may be defects that need further analysis or corrective repair.

Figure 16:
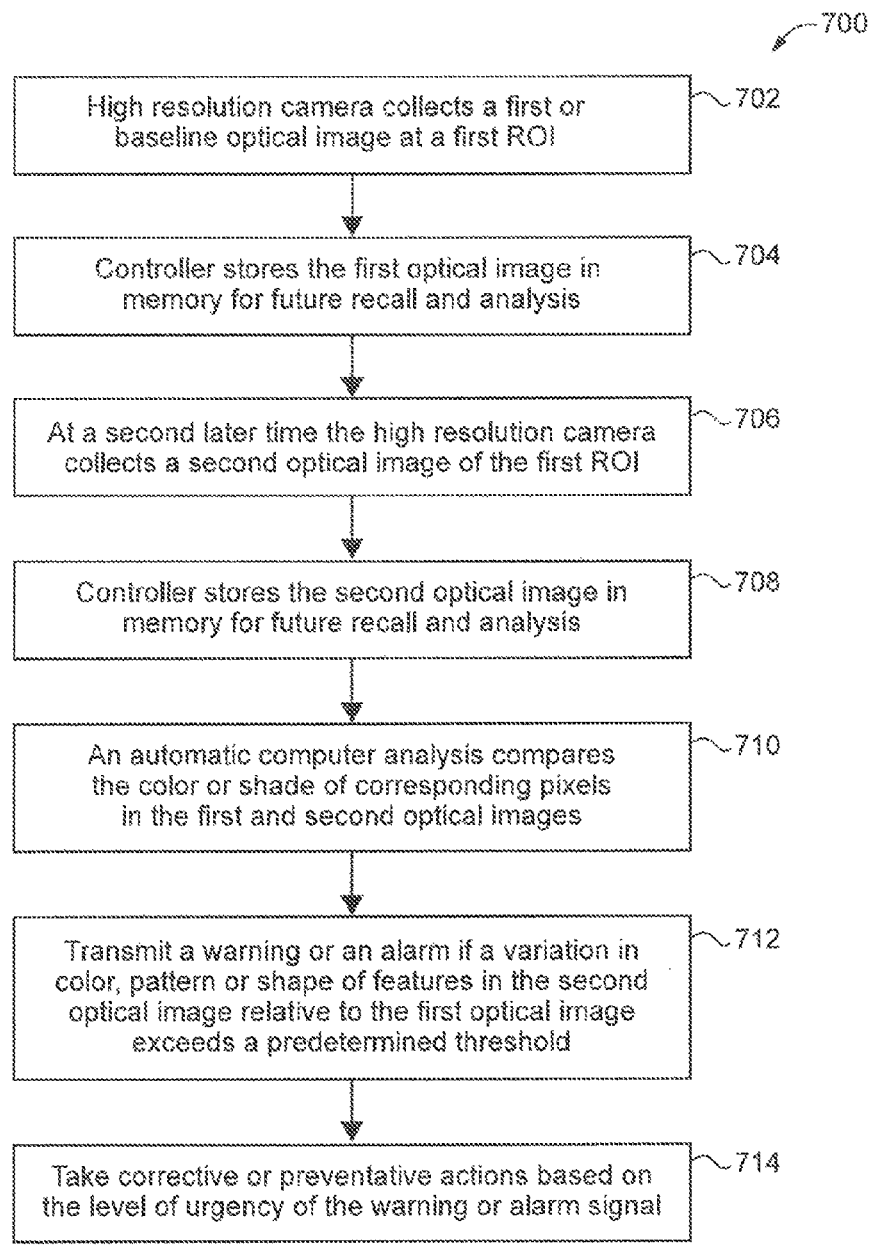
FIG. 16 illustrates a method for imaging and analyzing components in an E-House.

FIG. 16 illustrates a method 700 for imaging and analyzing components in an E-House. The method 700 begins at step 702 where a high resolution camera collects a first or baseline optical image at a first ROI. A controller stores the first optical image in a memory for future recall and analysis at step 704. At a second later time the high resolution camera collects a second optical image of the first ROI at step 706. The controller stores the second optical image in memory for future recall and analysis at step 708. An automatic computer analysis can compare the color or shade of corresponding pixels in the first and second optical images at step 710. If a variation in color, pattern or shape of certain features in the second optical image relative to the first optical image exceeds a predetermined threshold, then a warning or an alarm signal with an associated level of urgency can be transmitted at step 712. At step 714, corrective or preventative actions may be taken based on the level of urgency.

Unless otherwise indicated herein, like reference numerals will refer to like elements, and like element names will refer to like elements. For example, any of the embodiments described herein for the element "robot" or "conduit" or "controller/control system" will be equally applicable to any of the other embodiments, unless otherwise prohibited to the contrary. Thus, embodiments of the "robot" associated with the description of FIG. 1 will be understood to also apply to embodiments of the "robot" described in any of the other figures, for example FIG. 6, and vice versa. Or another non-limiting example, any of the variations in any of the functional interaction between the robot and portal 72A1 will be understood to apply to the portals 72D1-72D6, and vice versa. Or yet one more non-limiting example, any of the embodiments of robot/portal/conduit/inspection in FIGS. 1-4 apply equally as well to any of the embodiments of the same robot/portal/conduit/inspection in FIGS. 5-14D. No limitation is therefore hereby intended that any individual "robot", or "portal", or "track", or "conduit", etc will be limited to just the narrow confines of the description in the immediate vicinity that it is found in the instant description, unless otherwise prohibited to the contrary.

While the application has been illustrated and described in detail in the drawings and foregoing description, the same is to be considered as illustrative and not restrictive in character, it being understood that only the preferred embodiments have been shown and described and that all changes and modifications that come within the spirit of the applications are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method of inspecting electrical components within a housing, comprising:
   positioning a first camera within the housing,
   capturing a first optical image of an electrical component within the housing with the first camera;
   recording the first optical image;
   positioning a second camera within the housing;
   capturing a second optical image of the electrical component with the second camera;
   comparing pixels of the first and second optical images with an electronic control module; and
   generating a warning based upon a variation between the pixels of the first optical image and the pixels of the second optical image.

2. The method of claim 1, wherein the first and second cameras are the same camera.

3. The method of claim 1, wherein the variation is a color variation between the pixels of the first optical image and the pixels of the second optical image.

4. The method of claim 1, wherein the first optical image is a baseline captured at a new, cleaned or reconditioned state of the electrical component.

5. The method of claim 1, wherein the second optical image is captured more than one week after the first optical image.

6. The method of claim 1, wherein the electrical component or a portion thereof is identified from the first optical image by the electronic control module as a continuous area of the pixels having a same color or shade.

7. The method of claim 1, wherein the comparison identifies dust, grime and/or corrosion in the second optical image by identifying a percentage change in the pixels of the first optical image and the pixels of the second optical image.

8. The method of claim 1, wherein the comparison identifies a tree-like structure, edge and/or slot in the second optical image by identifying pixel changes in the second optical image compared to the first optical image, and identifying neighboring pixels in the second optical image with matching color or shade.

9. The method of claim 1, wherein the electrical component forms a portion of at least one of a switchgear, a control gear, a motor controller and an uninterrupted power supply (UPS).

10. The method of claim 1, wherein the first and second optical images are high resolution images of at least five megapixels.

11. The method of claim 1, wherein the first and second cameras are conveyed into the housing to a desired location and angular orientation with at least one robot.

12. The method of claim 1, wherein the first and second cameras are moved within the housing to a desired location and angular orientation with an internal maneuvering apparatus.

13. The method of claim 1, wherein the first and second optical images are captured at the same location and angular orientation.

14. The method of claim 13, wherein the first and second optical images are captured at the same light intensity.

15. The method of claim 1, wherein the first optical image is a baseline captured at a new, cleaned or reconditioned state of the electrical component, and the electrical component or a portion thereof is identified from the first optical image by the electronic control module as a continuous area of the pixels having a same color or shade.

16. The method of claim 15, wherein the comparison identifies dust, grime and/or corrosion in the second optical image by identifying a percentage change in the pixels of the first optical image and the pixels of the second optical image.

17. The method of claim 15, wherein the second optical image is captured more than one week after the first optical image.

18. The method of claim 17, wherein the first and second optical images are captured at the same location and angular orientation, and the first and second optical images are captured at the same light intensity.

19. The method of claim 18, wherein the first and second cameras are conveyed into the housing to a desired location and angular orientation with at least one robot, the first and second optical images are high resolution images of at least five megapixels, and the variation is a color variation between the pixels of the first optical image and the pixels of the second optical image.

20. The method of claim 19, wherein the first and second cameras are the same camera, and the electrical component forms a portion of at least one of a switchgear, a control gear, a motor controller and an uninterrupted power supply (UPS).

* * * * *